(12) United States Patent
Cao et al.

(10) Patent No.: US 9,689,983 B2
(45) Date of Patent: Jun. 27, 2017

(54) RADAR APPARATUS AND RUNNING VEHICLE SENSING METHOD

(71) Applicant: Panasonic Corporation, Osaka (JP)

(72) Inventors: Yunyun Cao, Tokyo (JP); Hirofumi Nishimura, Kanagawa (JP); Takaaki Kishigami, Tokyo (JP)

(73) Assignee: PANASONIC CORPORATION, Osaka (JP)

( * ) Notice: Subject to any disclaimer, the term of this patent is extended or adjusted under 35 U.S.C. 154(b) by 0 days.

(21) Appl. No.: 15/075,054

(22) Filed: Mar. 18, 2016

(65) Prior Publication Data

US 2016/0284213 A1 Sep. 29, 2016

(30) Foreign Application Priority Data

Mar. 24, 2015 (JP) .................. 2015-060620

(51) Int. Cl.
| | |
|---|---|
| *G08G 1/01* | (2006.01) |
| *G01S 13/93* | (2006.01) |
| *G01S 7/41* | (2006.01) |
| *G01S 13/26* | (2006.01) |
| *G01S 13/34* | (2006.01) |
| *G01S 13/42* | (2006.01) |
| *G01S 13/58* | (2006.01) |

(52) U.S. Cl.
CPC ............ *G01S 13/931* (2013.01); *G01S 7/415* (2013.01); *G01S 13/26* (2013.01); *G01S 13/343* (2013.01); *G01S 13/42* (2013.01); *G01S 13/582* (2013.01); *G01S 13/584* (2013.01); *G01S 2013/9325* (2013.01); *G01S 2013/9378* (2013.01)

(58) Field of Classification Search
CPC ...... G01S 13/931; G01S 13/26; G01S 13/343; G01S 13/42; G01S 13/582; G01S 13/584; G01S 7/415; G01S 2013/9325; G01S 2013/9332; G01S 2013/9378
USPC .............. 340/933, 935, 435; 701/300, 301; 342/104, 118, 147
See application file for complete search history.

(56) References Cited

U.S. PATENT DOCUMENTS

2014/0218227 A1* 8/2014 Stelzen ................ G01S 7/415
342/104

FOREIGN PATENT DOCUMENTS

| | | |
|---|---|---|
| JP | 60-122381 | 6/1985 |
| JP | 2011-180030 | 9/2011 |
| JP | 2011-238161 | 11/2011 |

\* cited by examiner

Primary Examiner — Thomas Mullen
(74) Attorney, Agent, or Firm — Seed IP Law Group LLP

(57) ABSTRACT

A radar receiver of a radar apparatus includes a Doppler frequency acquirer which, in operation, acquires a Doppler frequency for each of range bins from an echo signal, received via at least one antenna, which is a radar signal reflected by an object, a direction correlation power value calculator which, in operation, calculates, for each of combinations of the range bins and the Doppler frequencies, a direction correlation power value indicating strength of the echo signal for each of directions, a normalized direction correlation value calculator which, in operation, calculates, for each of the combinations of the range bins and the Doppler frequencies, a normalized direction correlation value indicating likelihood of a direction of arrival of the echo signal for each of the directions, and a running vehicle detector which, in operation, determines, on a basis of the direction correlation power value and the normalized direction correlation value, whether the object is a running vehicle.

11 Claims, 28 Drawing Sheets

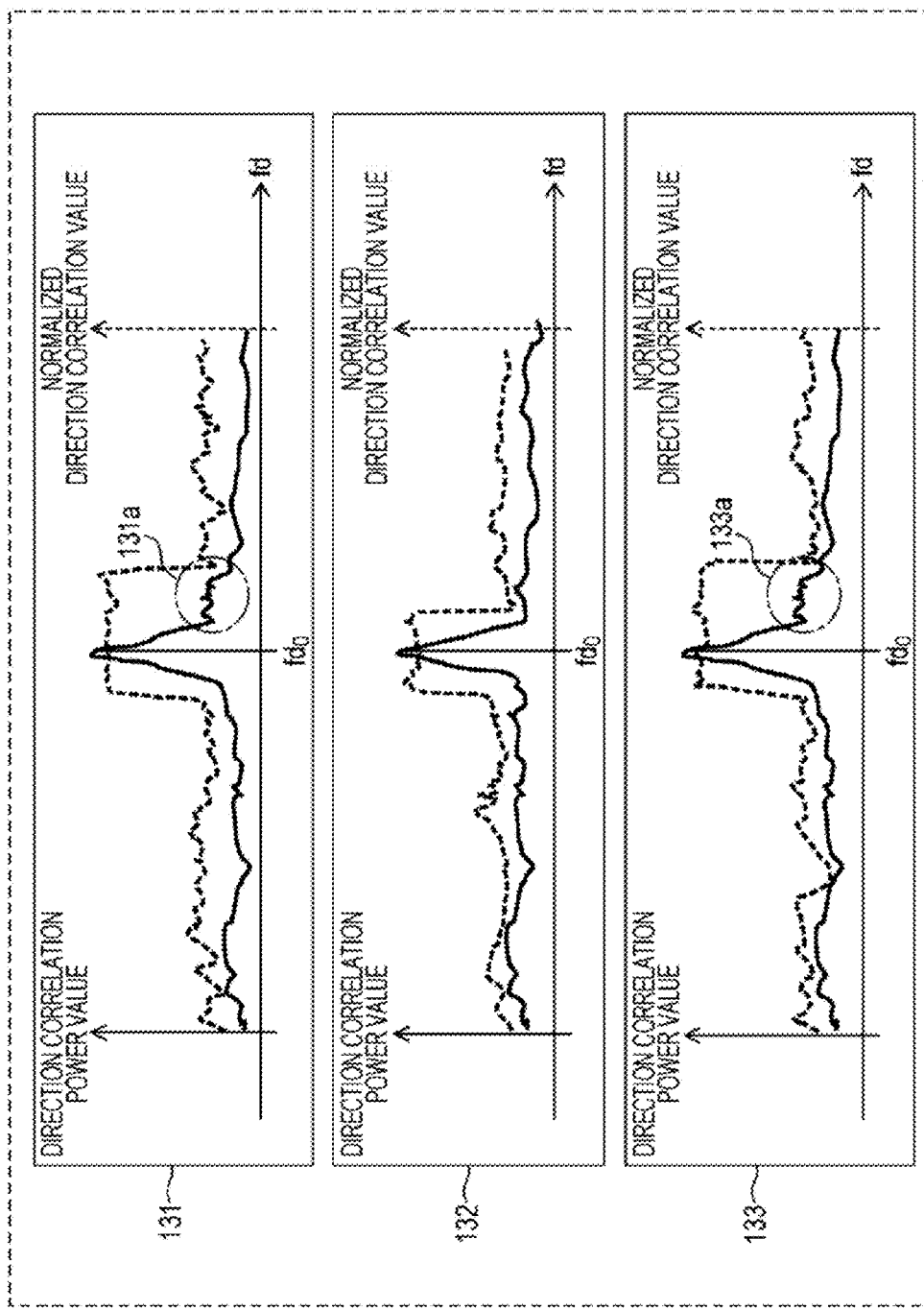

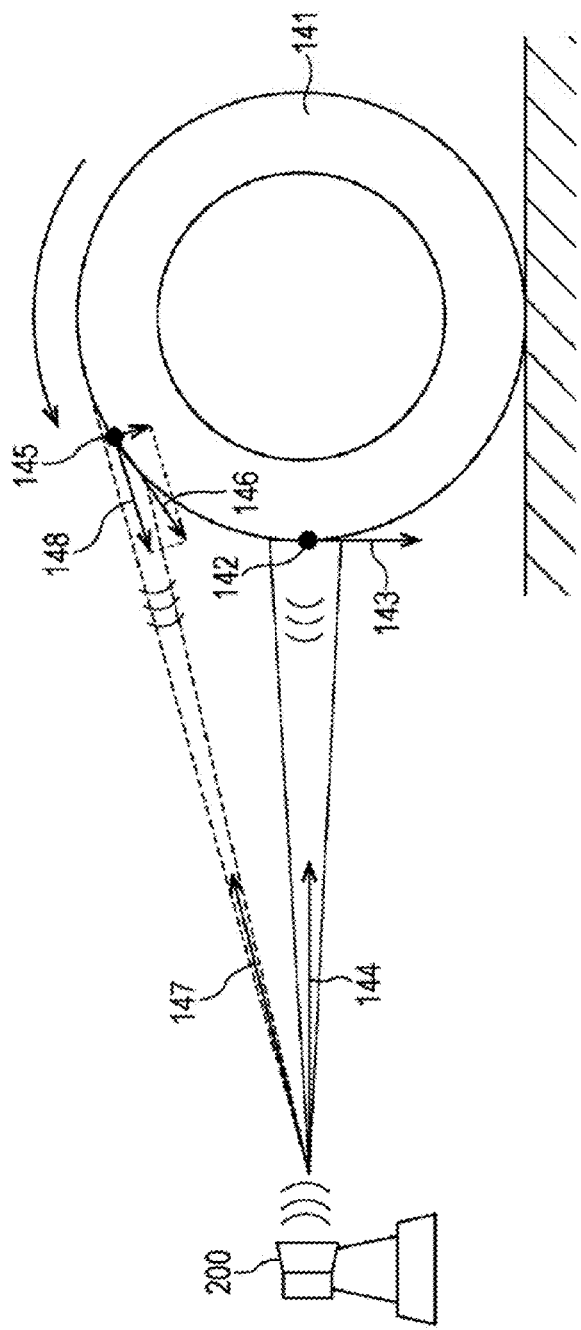

FIG. 11

| | First Range Bin | Second Range Bin | ... | k-th Range Bin | ... | K-th Range Bin |
|---|---|---|---|---|---|---|
| First Cycle | CI(1, 1) | CI(1, 2) | ... | CI(1, k) | ... | CI(1, K) |
| Second Cycle | CI(2, 1) | CI(2, 2) | ... | CI(2, k) | ... | CI(2, K) |
| ... | ... | ... | ... | ... | ... | ... |
| m-th Cycle | CI(m, 1) | CI(m, 2) | ... | CI(m, k) | ... | CI(m, K) |
| ... | ... | ... | ... | ... | ... | ... |
| M-th Cycle | CI(M, 1) | CI(M, 2) | ... | CI(M, k) | ... | CI(M, K) |
| (M+1)-th Cycle | CI(M+1, 1) | CI(M+1, 2) | ... | CI(M+1, k) | ... | CI(M+1, K) |
| ... | ... | ... | ... | ... | ... | ... |

620

One Frame (columns)

FIG. 16
840

| | FIRST RANGE BIN | SECOND RANGE BIN | ... | k-TH RANGE BIN | ... | K-TH RANGE BIN |
|---|---|---|---|---|---|---|
| FIRST DOPPLER FREQUENCY | Fd(1, 1) | Fd(1, 2) | ... | Fd(1, k) | ... | Fd(1, K) |
| SECOND DOPPLER FREQUENCY | Fd(2, 1) | Fd(2, 2) | ... | Fd(2, k) | ... | Fd(2, K) |
| ... | ... | ... | ... | ... | ... | ... |
| m-TH DOPPLER FREQUENCY | Fd(m, 1) | Fd(m, 2) | ... | Fd(m, k) | ... | Fd(m, K) |
| ... | ... | ... | ... | ... | ... | ... |
| M-TH DOPPLER FREQUENCY | Fd(M, 1) | Fd(M, 2) | ... | Fd(M, k) | ... | Fd(M, K) |

ONE FRAME

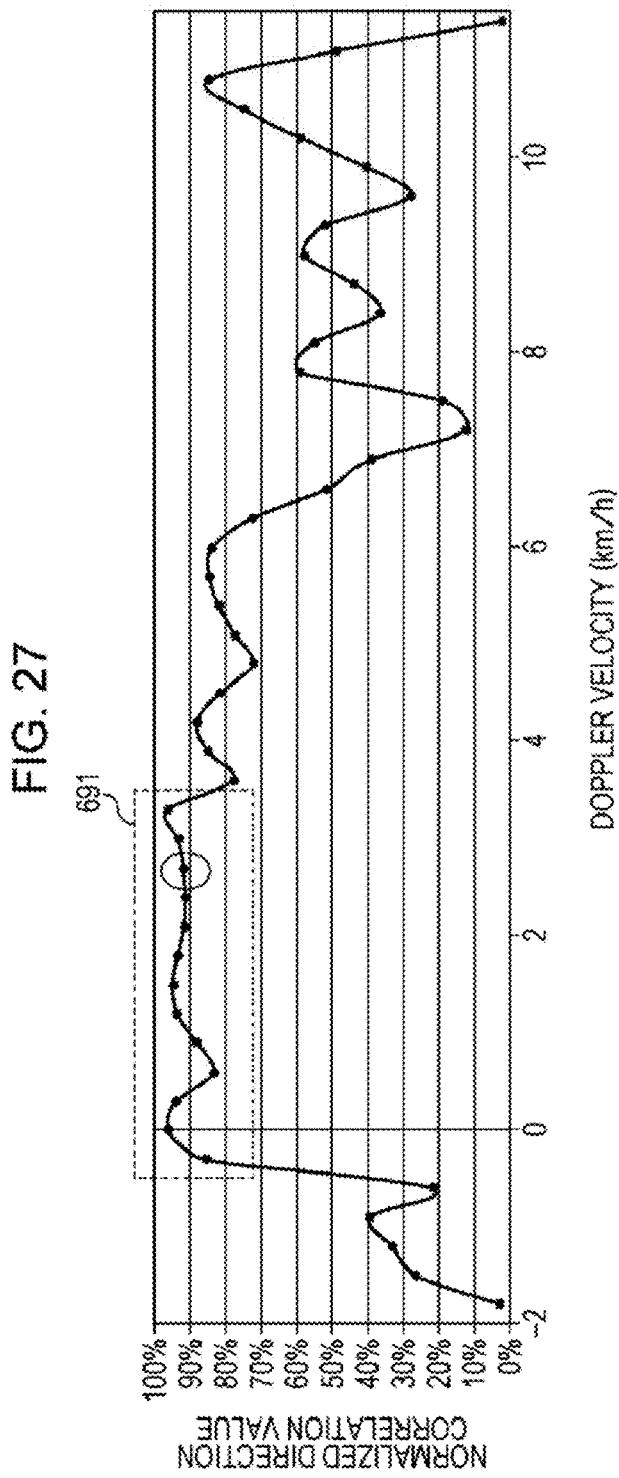

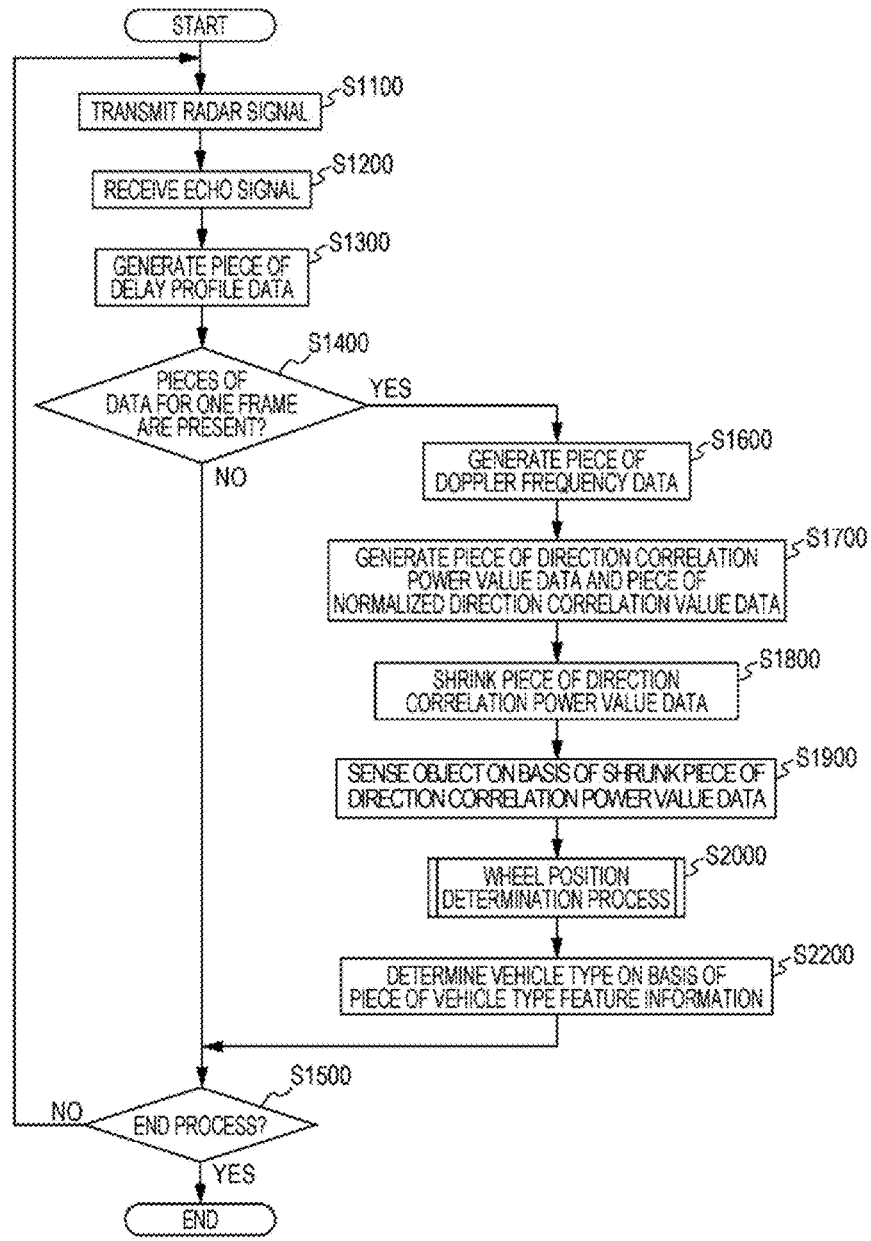

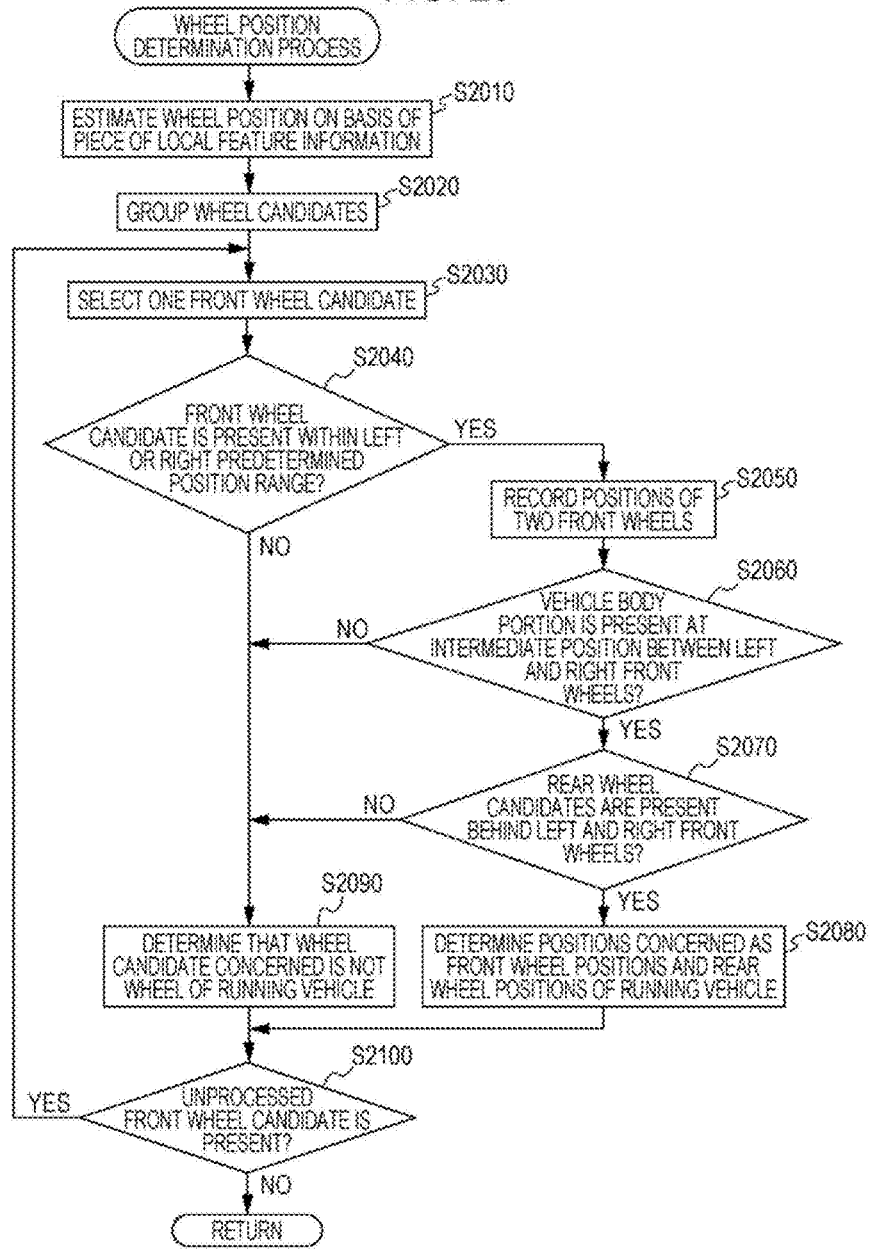

RADAR APPARATUS AND RUNNING VEHICLE SENSING METHOD

BACKGROUND

1. Technical Field

The present disclosure relates to a radar apparatus and a running vehicle sensing method.

2. Description of the Related Art

Techniques for sensing an object (target) by a radar apparatus are disclosed in, for example, Japanese Unexamined Patent Application Publications Nos. 60-122381 and 2011-180030.

The radar apparatus disclosed in Japanese Unexamined Patent Application Publication No. 60-122381 samples a radar received wave (receive signal) including a reflected wave from an object and ground clutter as a reflected wave from the ground for each range bin which is a unit of processing for a search target distance and obtains a Doppler component of the receive signal for each range bin. The radar apparatus disclosed in Japanese Unexamined Patent Application Publication No. 60-122381 then compares the magnitude of a variation in a power value (Doppler component) of a receive signal in the Doppler frequency domain with a predetermined threshold. Even in the presence of effects of ground clutter, such a technique is capable of sensing as an object if the power of a certain frequency component is higher than that of a surrounding frequency component in the Doppler frequency domain.

The radar apparatus disclosed in Japanese Unexamined Patent Application Publication No. 2011-180030 calculates phase differences of peak frequencies in beat signal received by a plurality of receiving antenna elements. The radar apparatus disclosed in Japanese Unexamined Patent Application Publication No. 2011-180030 also calculates a direction of an object on the basis of the calculated phase differences between the plurality of receiving antenna elements and the relative positional relationship among the plurality of receiving antenna elements. Such a technique is capable of sensing a plurality of objects located in different directions.

SUMMARY

There is a need of the marketplace to sense the surrounding vehicles which are running (hereinafter referred to as a "running vehicle") for traffic safety.

The above-described conventional techniques, however, are incapable of discriminate a running vehicle from some other objects, such as a pedestrian or a person carrying a baggage. If the movement velocity of a radar apparatus itself is unknown, whether an object is moving cannot be determined. A technique capable of sensing a running vehicle with high accuracy is thus desired.

Thus, a non-limiting exemplary embodiment of the present disclosure provides a radar apparatus and a running vehicle sensing method capable of sensing a running vehicle with high accuracy.

In one general aspect, the techniques disclosed here feature a radar apparatus including a Doppler frequency acquirer which, in operation, acquires a Doppler frequency for each of range bins from an echo signal, received via at least one antenna, which is a radar signal reflected by an object, a direction correlation power value calculator which, in operation, calculates, for each of combinations of the range bins and the Doppler frequencies, a direction correlation power value indicating strength of the echo signal for each of directions, a normalized direction correlation value calculator which, in operation, calculates, for each of the combinations of the range bins and the Doppler frequencies, a normalized direction correlation value indicating likelihood of a direction of arrival of the echo signal for each of the directions, and a running vehicle detector which, in operation, determines, on a basis of the direction correlation power value and the normalized direction correlation value, whether the object is a running vehicle.

These general and specific aspects may be implemented using a device, a system, a method, and a computer program, and any combination of devices, systems, methods, and computer programs.

The present disclosure allows high-accuracy sensing of a running vehicle.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 1B is a graph showing the relationships between Doppler frequency and normalized direction correlation value and between Doppler frequency and direction correlation power value;

FIG. 2 shows a radial component which is the relative velocity of each part of a rotating tire to a radar;

FIG. 11 shows one example of the structure of delay profile data according to the present embodiment;

FIG. 16 shows one example of the configuration of Doppler frequency data according to the present embodiment;

FIG. 27 shows one example of the relationship between Doppler velocity and normalized direction correlation value for the cell where the pedestrian is located, according to the present embodiment;

FIG. 28 shows, by a flowchart, one example of the operation of the radar apparatus according to the present embodiment; and FIG. 29 shows, by a flowchart, one example of a wheel position determining process according to the present embodiment;

DETAILED DESCRIPTION

One embodiment of the present disclosure will be described in detail below with reference to the drawings.

<Overview of Running Vehicle Sensing>

An overview of running vehicle sensing according to the present embodiment will be described first.

Figure 1A:
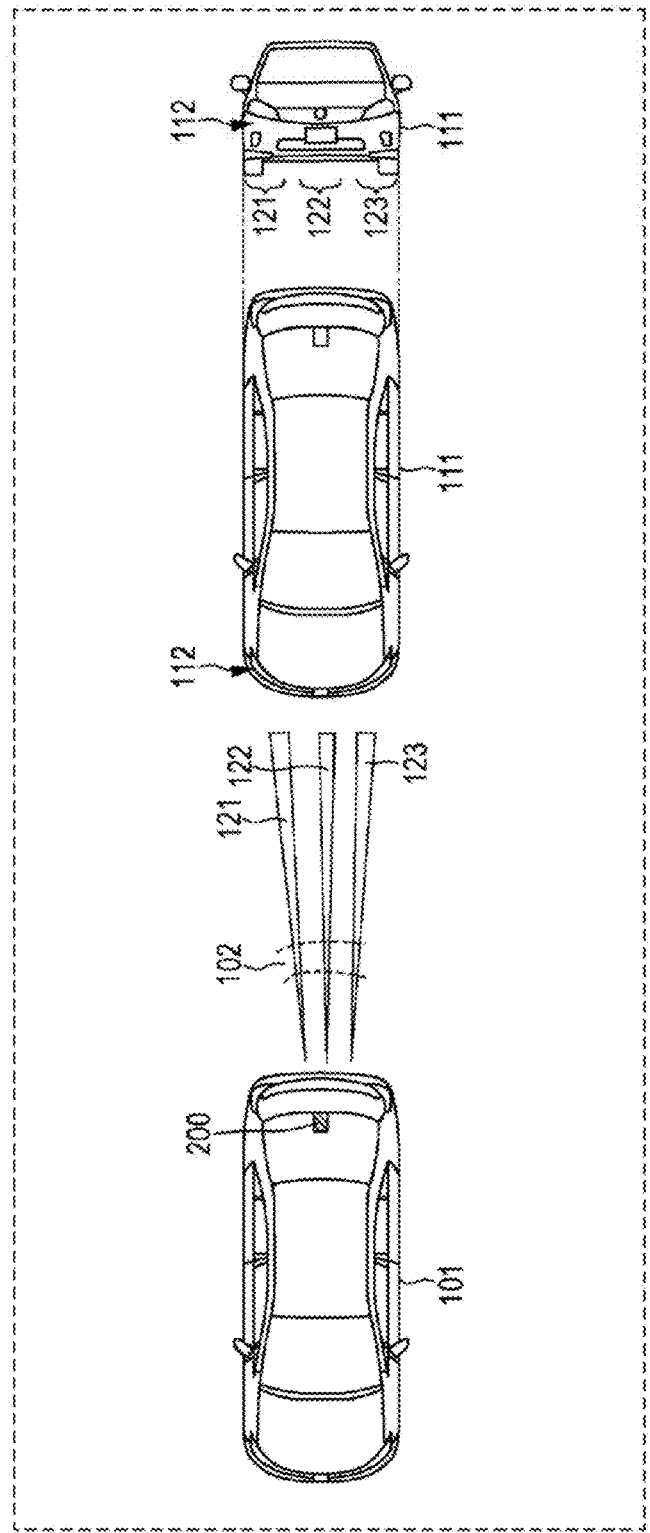
FIG. 1A shows an overview of the principle of running vehicle sensing according to the present embodiment.

FIG. 1A is a view for explaining an overview of running vehicle sensing according to the present embodiment.

As shown in FIG. 1A, a radar apparatus 200 according to the present embodiment is installed at a rear portion of a vehicle 101 and transmits a radar transmit signal 102 to the vehicle 111 behind. If a running vehicle 111 is located behind the vehicle (hereinafter referred to as a "vehicle in question") 101 with the radar apparatus 200 mounted therein, the transmitted radar signal 102 is reflected from each part (for example, a front 112) of the running vehicle 111 and returns as an echo signal to the radar apparatus 200.

The radar apparatus 200 receives the echo signal using an array antenna (not shown). The radar apparatus 200 generates a delay profile on the basis of the echo signal and calculates respective power values of predetermined Doppler frequency components using the generated delay profile. The radar apparatus 200 also estimates a direction of arrival of a signal for each combination of a range bin and a Doppler frequency on the basis of the calculated power values and relative positional information of the array antenna.

The term delay profile here refers to a piece of information indicating the relationship between a distance from the radar apparatus 200 and the power of an echo signal from an object located at the distance. A "distance" here is also referred to as a "range".

The term Doppler frequency refers to a piece of information indicating a frequency fluctuation in an echo signal caused by the Doppler effect when there is relative motion between an object as a reflector of a radar signal and the radar apparatus 200. That is, the term Doppler frequency refers to a frequency indicating the relative velocity (Doppler velocity) of the object to the radar apparatus 200.

Note that a direction is defined by a direction on a horizontal plane in the present embodiment. A direction, however, may be defined by another type of direction, such as a direction on a vertical plane or a combination of a direction on the horizontal plane and a direction on the vertical plane. Note that an estimable direction depends on the arrangement of the array antenna of the radar apparatus 200.

The radar apparatus 200 calculates a normalized direction correlation value and a direction correlation power value of each direction for each combination of a range bin and a Doppler frequency, on the basis of pieces of Doppler frequency data acquired.

The term normalized direction correlation value here refers to a parameter indicating the likelihood of a direction of interest being a direction of arrival of an echo signal. The term direction correlation power value refers to a value indicating the strength of the power of an echo signal coupled with the likelihood of a direction of interest being a direction of arrival of the echo signal.

More specifically, a normalized direction correlation value is a result by normalizing, for each direction angle of interest, a correlation between a direction vector representing a complex response of each receiving antenna element of the array antenna and a correlation vector representing a received signal from each receiving antenna element by the 2-norm of the correlation vector. The details of a normalized direction correlation value will be described later.

A direction correlation power value is a value obtained by squaring the inner product of a correlation vector composed of a receive signal from each receiving antenna element of the array antenna and a direction vector representing a complex response of the receiving antenna when a receive signal arrives from the direction of interest. The details of a direction correlation power value will be described later.

A direction in which a right front wheel of the front portion 112 of the running vehicle 111 is located is a first direction 121, a direction in which a vehicle body central portion is located is a second direction 122, and a direction in which a left front wheel is located is a third direction 123.

First to third graphs 131 to 133 shown in FIG. 1B are graphs indicating the relationships between Doppler frequency and normalized direction correlation value and between Doppler frequency and direction correlation power value in the first to third directions 121 to 123. In each of the first to third graphs 131 to 133, the horizontal axis indicates Doppler frequency (fd), the right vertical axis indicates normalized direction correlation value, and the left vertical axis indicates direction correlation power value. In each of the first to third graphs 131 to 133, a broken line indicates a normalized direction correlation value at each Doppler frequency, and a solid line indicates a direction correlation power value at each Doppler frequency.

If a moving object is present, there is a Doppler frequency band where a normalized direction correlation value (dotted line) is continuously high, as shown in the first to third graphs 131 to 133.

FIG. 2 is a view for explaining the Doppler frequency of a rotating tire portion.

As shown in FIG. 2, in the running vehicle 111, a wheel (tire) 141 is rotating. When the rotating wheel 141 is observed from the front of the running vehicle 111, a Doppler velocity component at each part of the wheel 141 which is measured by the radar apparatus 200 includes a Doppler velocity component produced by rotation of the part reflecting a radar transmit signal.

For example, a direction of velocity 143 which indicates the rotating direction of a front central portion 142 of the wheel 141 is orthogonal to a radial direction (observation direction) 144 of the radar apparatus 200. For this reason, the relative velocity of the portion 142 to the radar apparatus 200 is almost identical to the movement velocity of a vehicle body.

A velocity direction 146 based on rotation of a front upper portion 145 of the wheel 141 is not orthogonal to a radial direction (observation direction) 147 of the radar apparatus 200. For this reason, a Doppler velocity component 148 based on rotation is added at the portion 145, and a Doppler velocity component higher than the movement velocity of the vehicle body is detected.

As a result, Doppler components of the wheel 141 which are measured by the radar apparatus 200 spread wider than the vehicle body velocity. The term "Doppler spread width" here refers to the number of Doppler frequency components included in echo signals from a certain object, which represents the range of velocity components of the object.

Thus, as shown in the first to third graphs 131 to 133 in FIG. 1B, a normalized direction correlation value (dotted line) is high in a wider frequency band for the first and third directions 121 and 123, in which wheels are located, than for the second direction 122, in which no wheel is located.

In the case of a vehicle, the degree of signal reflection from a metallic vehicle body portion is high. For this reason, in the case of the second direction 122, in which no wheel is located, a direction correlation power value (solid line) is high in a narrow band centered at a Doppler frequency $fd_0$ corresponding to the relative velocity of a vehicle body portion, as shown in the second graph 132 in FIG. 1B.

In the case of the first and third directions 121 and 123, in which wheels are located, a direction correlation power value (solid line) is relatively high in a band off the Doppler frequency $fd_0$ of the vehicle body portion, as indicated by a portion 131a. The portion 131a is a velocity component of a wheel portion. In the portion 131a, a waveform of the direction correlation power value on the Doppler frequency axis changes gently and smoothly between a value at the peak portion and a value at a portion with a low normalized direction correlation value.

When the rotating wheel is observed from in front of or behind the vehicle, the Doppler velocity at each part of the surface of a wheel is obtained by adding a velocity component in a radial direction of the radar apparatus 200 which is produced by rotation of the wheel to the Doppler velocity of the vehicle body portion, and the Doppler velocity changes almost continuously along the surface of the wheel. Thus, the direction correlation power value changes gently and smoothly, as described above.

As described above, for a direction in which a wheel of a running vehicle is located, a direction correlation power value exhibits a characteristic distribution like those of the first and third graphs 131 and 133 in a band with a high normalized direction correlation value on the Doppler frequency axis.

The radar apparatus 200 according to the present embodiment is based on the above-described underlying knowledge and is configured to perform running vehicle sensing by calculating a normalized direction correlation value and a direction correlation power value of each Doppler frequency for each direction and sensing a wheel of a running vehicle (hereinafter simply referred to as a "wheel" as needed) from a calculation result.

The radar apparatus 200 according to the present embodiment is also configured to determine the vehicle type of a sensed running vehicle on the basis of features, such as the relative positions of a plurality of wheels sensed.

<Configuration of Radar Apparatus>

The configuration of the radar apparatus 200 according to the present embodiment will be described.

Figure 3:
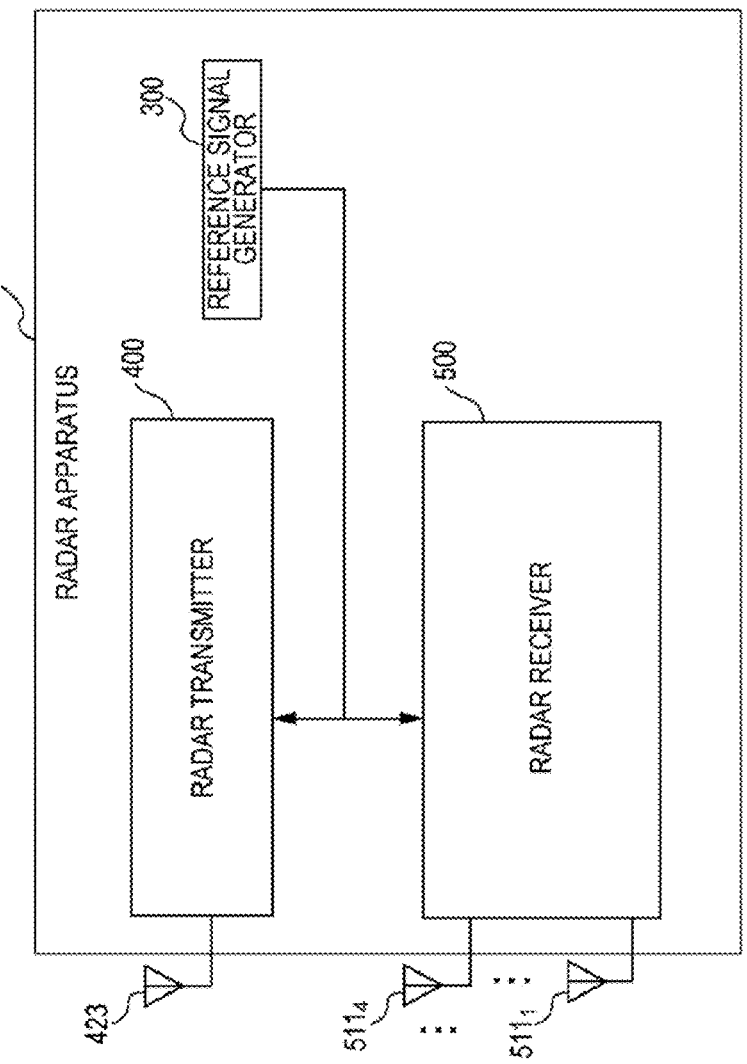
FIG. 3 shows one example of the configuration of a radar apparatus according to the present embodiment.

FIG. 3 is a block diagram showing one example of the configuration of the radar apparatus 200.

In FIG. 3, the radar apparatus 200 includes a reference signal generator 300, a radar transmitter 400, and a radar receiver 500.

The reference signal generator 300 is connected to the radar transmitter 400 and to the radar receiver 500. The reference signal generator 300 generates a signal for reference as a reference signal and supplies the generated signal for reference to the radar transmitter 400 and to the radar receiver 500. That is, the reference signal generator 300 synchronizes processing by the radar transmitter 400 with processing by the radar receiver 500.

The radar transmitter 400 generates a high-frequency radar signal on the basis of the signal for reference and outputs the generated radar signal through a transmitting antenna 423.

The radar receiver 500 receives an echo signal (reflected wave signal) which is a radar signal reflected by an object (target) at each of first to fourth receiving antenna elements $511_1$ to $511_4$. The radar receiver 500 performs predetermined signal processing and data processing on first to fourth receive signals which are echo signals received by the first to fourth receiving antenna elements $511_1$ to $511_4$ on the basis of the signal for reference and senses an object, such as a running vehicle.

Figure 4:
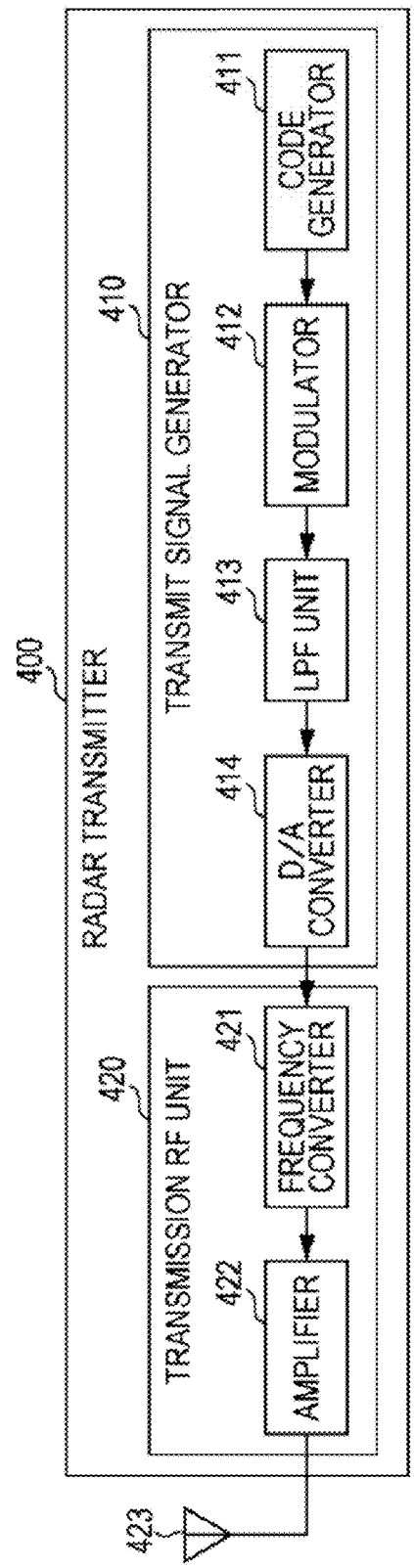
FIG. 4 shows one example of the configuration of a radar transmitter according to the present embodiment.

FIG. 4 is a block diagram showing one example of the configuration of the radar transmitter 400.

In FIG. 4, the radar transmitter 400 includes a transmit signal generator 410 and a transmission radio frequency (RF) unit 420. The transmit signal generator 410 and the transmission RF unit 420 operate in accordance with signals obtained by multiplying the signal for reference by different numbers or the same number.

The transmit signal generator 410 generates a transmit signal which is an encoded pulse signal and outputs the generated transmit signal to the transmission RF unit 420.

Note that the details of a transmit signal generated by the transmit signal generator 410 will be described later. The transmit signal generator 410 includes a code generator 411, a modulator 412, a low pass filter (LPF) unit 413, and a digital/analog (D/A) converter 414.

The code generator 411 generates a predetermined transmission code and outputs the generated transmission code to the modulator 412.

The modulator 412 pulse-modulates the input transmission code to generate a transmit signal and outputs the generated transmit signal to the LPF unit 413.

The LPF unit 413 outputs only a signal component within or below a limited band set in advance of the input transmit signal to the D/A converter 414. Note that the LPF unit 413 may be arranged downstream of the D/A converter 414 (to be described later).

The D/A converter 414 converts an input digital transmit signal into an analog transmit signal and outputs the analog transmit signal to the transmission RF unit 420.

The transmission RF unit 420 up-converts the input transmit signal to generate a radar transmit signal in a carrier frequency band (for example, a millimeter wave band) and outputs the radar transmit signal to the transmitting antenna 423. The transmitting antenna 423 emits, as a radar signal (radar transmit signal), the radar transmit signal generated by the transmission RF unit 420 to a space around the radar apparatus 200. The transmission RF unit 420 includes a frequency converter 421, an amplifier 422, and the transmitting antenna 423.

The frequency converter 421 generates a transmit signal in a carrier frequency band (for example, a millimeter wave band) by up-converting an input transmit signal. The frequency converter 421 outputs the up-converted transmit signal to the amplifier 422. More specifically, the frequency converter 421 generates a transmission reference signal in the carrier frequency band which is obtained by multiplying a signal for reference by a predetermined number. The frequency converter 421 up-converts the transmit signal on the basis of the generated transmission reference signal.

The amplifier 422 amplifies the signal level of the input transmit signal to a predetermined signal level and outputs the amplified transmit signal to the transmitting antenna 423.

The transmitting antenna 423 emits, as a radar signal, the input transmit signal to the space around the radar apparatus 200. The radar signal reflected by an object returns as an echo signal to the radar receiver 500.

Figure 5:
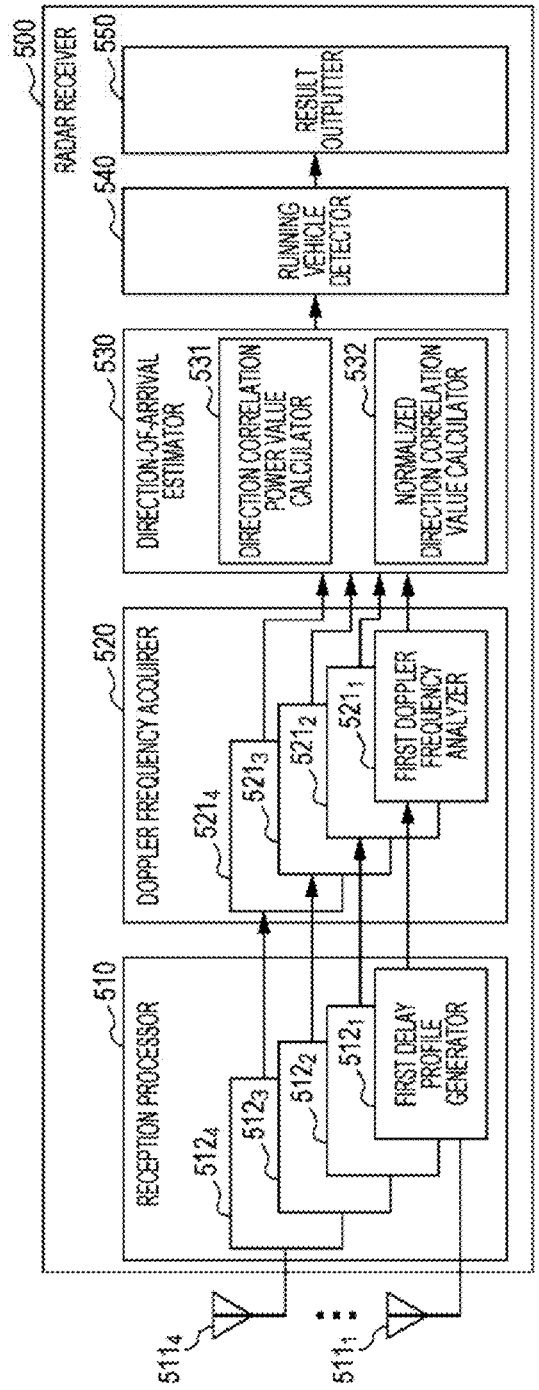
FIG. 5 shows one example of the configuration of a radar receiver according to the present embodiment.

FIG. 5 is a block diagram showing one example of the configuration of the radar receiver 500.

In FIG. 5, the radar receiver 500 includes a reception processor 510, a Doppler frequency acquirer 520, a direction-of-arrival estimator 530, a running vehicle detector 540, and a result outputter 550.

The reception processor 510 performs reception processing for an echo signal. The reception processor 510 includes the first to fourth receiving antenna elements $511_1$ to $511_4$ and first to fourth delay profile generators $512_1$ to $512_4$.

The first to fourth receiving antenna elements $511_1$ to $511_4$ constitute an array antenna and are connected to the first to fourth delay profile generators $512_1$ to $512_4$ on a one-to-one basis. The first to fourth receiving antenna elements $511_1$ to $511_4$ have the same configuration and will be collectively described below as "receiving antennas 511", as needed. The first to fourth delay profile generators $512_1$ to $512_4$ also have the same configuration and will be collectively described below as "delay profile generators 512", as needed.

The receiving antenna 511 receives an echo signal and outputs the received echo signal as a receive signal to the corresponding delay profile generator 512 (connected thereto).

Note that the relative positional relationship among the first to fourth receiving antenna elements $511_1$ to $511_4$ are defined in advance. When the first to fourth receiving antenna elements $511_1$ to $511_4$ receive respective echo signals from a single object, first to fourth reception signals received by the first to fourth receiving antenna elements $511_1$ to $511_4$ have phase differences (hereinafter referred to as "inter-antenna phase differences") corresponding to the relative positional relationship. The details of an inter-antenna phase difference will be described later.

The delay profile generator 512 samples an input receive signal at each predetermined discrete time point. The delay profile generator 512 calculates a piece of in-phase (I) data which is an in-phase signal of a receive signal and a piece of quadrature (Q) data which is a quadrature signal for each of range bins, which is a the unit of distance for separating a sensing target of the radar apparatus 200.

More specifically, the delay profile generator 512 performs correlation processing between a radar transmit signal and a receive signal, generates a correlation signal including a piece of arrival delay information of the receive signal (echo signal), and adds the correlation signal for a predetermined number of times. Thus, the delay profile generator 512 periodically generates a delay profile at intervals determined by a transmission cycle and the number of additions.

The delay profile generator 512 outputs a generated I/Q delay profile (hereinafter simply referred to as a "delay profile") to the Doppler frequency acquirer 520.

Note that the delay profile generator 512 operates in accordance with a reception reference signal which is obtained by multiplying the signal for reference by the same predetermined number as that for the transmission RF unit 420. Thus, processing by the transmission RF unit 420 is synchronous with processing by the delay profile generator 512.

The Doppler frequency acquirer 520 analyzes a delay profile and acquires the power value of a Doppler frequency component in each range bin from each receive signal, for each of the first to fourth receiving antenna elements $511_1$ to $511_4$. The Doppler frequency acquirer 520 includes first to fourth Doppler frequency analyzers $521_1$ to $521_4$.

The first to fourth Doppler frequency analyzers $521_1$ to $521_4$ are connected to the first to fourth delay profile generators $512_1$ to $512_4$ on a one-to-one basis. The first to fourth Doppler frequency analyzers $521_1$ to $521_4$ have the same configuration and will be collectively described below as "Doppler frequency analyzers 521", as needed.

The Doppler frequency analyzer 521 analyzes an input delay profile and acquires the power value of each Doppler frequency component in each range bin of a receive signal received by the corresponding receiving antenna 511 (connected via the delay profile generator 512). The Doppler frequency analyzer 521 outputs an acquired series of pieces of Doppler frequency power value data (hereinafter referred to as "pieces of Doppler frequency data") to the direction-of-arrival estimator 530.

Pieces of Doppler frequency data output by the first to fourth Doppler frequency analyzers $521_1$ to $521_4$ will be referred to as a piece of first Doppler frequency data to a piece of fourth Doppler frequency data, as needed.

The direction-of-arrival estimator 530 estimates a direction of arrival of an echo signal (that is, a direction in which an object is located) on the basis of a piece of first Doppler frequency data to a piece of fourth Doppler frequency data. More specifically, the direction-of-arrival estimator 530 calculates, for each combination of a Doppler frequency and at least one of a distance (range) and a direction, a direction correlation power value and a normalized direction correlation value as described above and estimates a direction of arrival of an echo signal from the above calculation results. The direction-of-arrival estimator 530 includes a direction correlation power value calculator 531 and a normalized direction correlation value calculator 532.

The direction correlation power value calculator 531 calculates, for each combination of a direction and a Doppler frequency, a direction correlation power value from a piece of first Doppler frequency data to a piece of fourth Doppler frequency data on the basis of the relative positional relationship among the first to fourth receiving antenna elements $511_1$ to $511_4$. The direction correlation power value calculator 531 outputs a series of obtained direction correlation power values (hereinafter referred to as "pieces of direction correlation power value data") which are calculated along the Doppler frequency axis to the running vehicle detector 540.

The normalized direction correlation value calculator 532 calculates, for each combination of a direction and a Doppler frequency, a normalized direction correlation value from a piece of first Doppler frequency data to a piece of fourth Doppler frequency data on the basis of the relative positional relationship among the first to fourth receiving antenna elements $511_1$ to $511_4$. The normalized direction correlation value calculator 532 outputs a series of obtained normalized direction correlation values (hereinafter referred to as "pieces of normalized direction correlation value data") which are calculated along the Doppler frequency axis to the running vehicle detector 540.

The running vehicle detector 540 determines whether an object as a reflector of a radar signal is present and whether the object is a running vehicle, on the basis of the direction correlation power values and the normalized direction correlation values.

Figure 6:
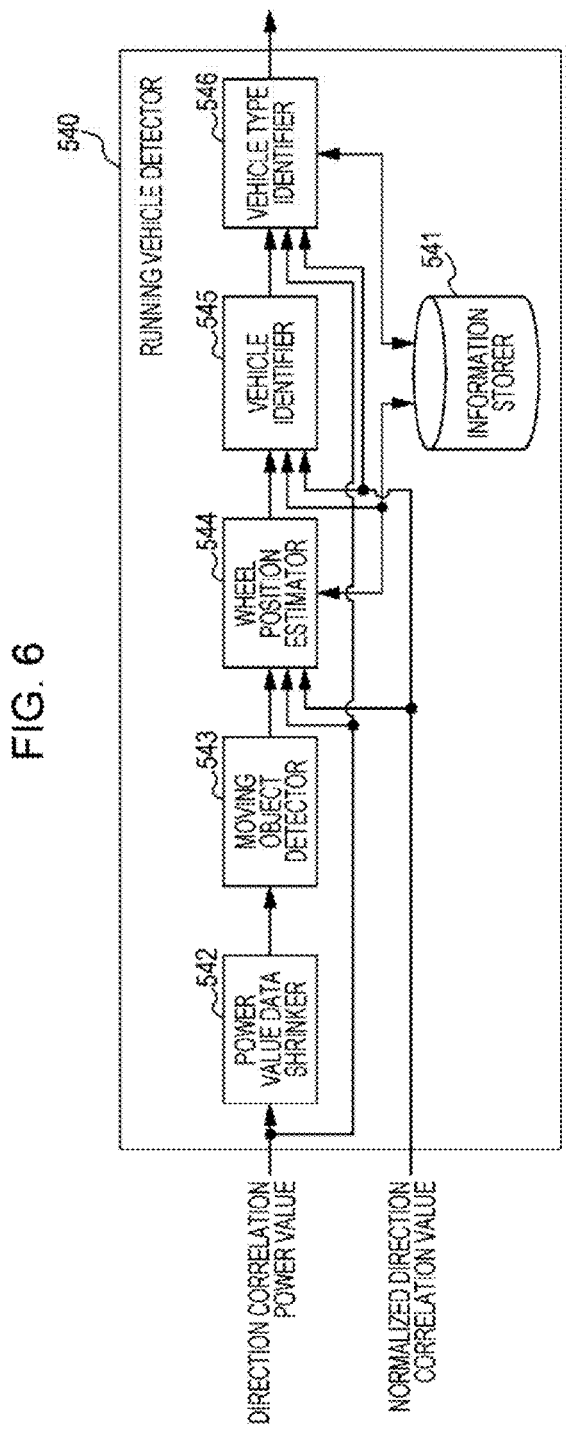
FIG. 6 shows one example of the configuration of a running vehicle detector according to the present embodiment.

FIG. 6 is a block diagram showing one example of the configuration of the running vehicle detector 540.

In FIG. 6, the running vehicle detector 540 includes an information storer 541, a power value data shrinker 542, a moving object detector 543, a wheel position estimator 544, a vehicle identifier 545, and a vehicle type identifier 546.

The information storer 541 stores a piece of local feature information and a piece of vehicle type feature information in advance. The term piece of local feature information refers to a piece of information indicating a local feature which is a feature of at least one of a position and an echo signal component in a direction in which a wheel portion is present. The term piece of vehicle type feature information refers to a piece of information indicating a feature of at least one of a position and an echo signal component in a direction in which a wheel portion of a predetermined vehicle type of automobile is present.

A piece of local feature information and a piece of vehicle type feature information are obtained in advance on the basis of echo signals collected from, for example, a large number of running vehicles including a predetermined vehicle type of automobile and objects other than a running vehicle by a known machine learning method, such as deep learning or boosting.

That is, a piece of local feature information has the form of, for example, an identifier which classifies an echo signal as either one of an echo signal from a wheel portion of a running vehicle and an echo signal from an object other than a wheel of a running vehicle. A piece of vehicle type feature information has the form of, for example, the distance between wheels for a particular vehicle type, or an identifier which classifies a Doppler feature from the power value of an echo signal from a wheel portion or from a vehicle body portion as either one of a feature of a particular vehicle type of automobile or a feature of an object other than the particular vehicle type of automobile.

Alternatively, a piece of local feature information and a piece of vehicle type feature information may each be, for example, a template for a data waveform of a delay profile, a piece of direction correlation power value data, a piece of normalized direction correlation value data, or the like or a template for arrangement of cells (i.e. direction-range unit) corresponding to wheel positions.

Note that, in the present embodiment, a vehicle type may be a broad vehicle type indicating whether a vehicle is a truck or a passenger car or a more detailed vehicle type indicating whether a vehicle is a passenger car named B from Company A or a passenger car named D from Company C. A new tire and a well-worn tire differ in surface condition and may differ in a Doppler component from a wheel portion. Thus, a vehicle type may be a tire condition type indicating whether a tire is new or old.

The power value data shrinker 542 compresses (shrinks) a piece of direction correlation power value data input from the direction-of-arrival estimator 530 into a piece of data of direction correlation power value for each combination of a direction and a Doppler frequency. As a shrinking method, for example, the process of setting, for each combination of a direction and a Doppler frequency, a range with a maximum direction correlation power value among all ranges and the power value of the range as values for the above combination of the direction and the Doppler frequency can be adopted. The power value data shrinker 542 outputs a compressed piece of direction correlation power value data (hereinafter referred to as a "piece of compressed direction correlation power value data") to the moving object detector 543.

The moving object detector 543 detects the presence of a moving object as a reflector of a radar signal and the position (hereinafter referred to as an "object position") of the moving object on the basis of a piece of compressed direction correlation power value data (hereinafter referred to as a "direction-Doppler power map", as needed) input from the power value data shrinker 542.

Figure 7:
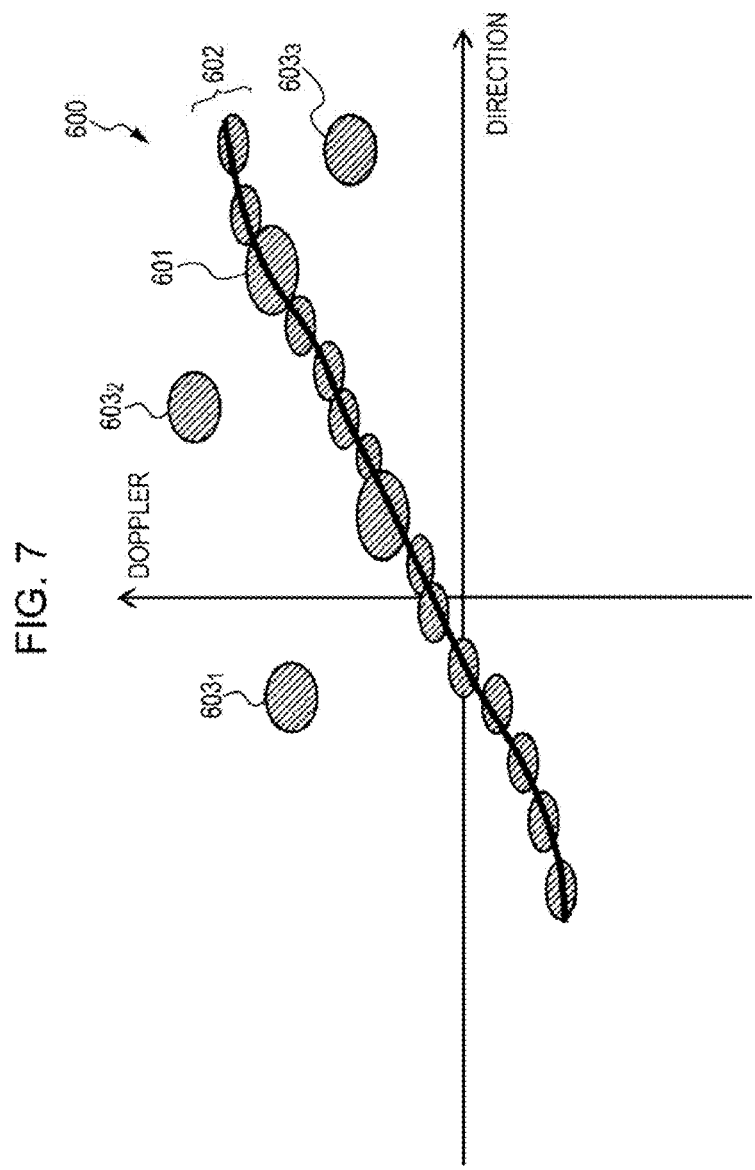
FIG. 7 shows one example of a Direction-Doppler power map according to the present embodiment.

FIG. 7 is a chart showing one example of a direction-Doppler power map.

As shown in FIG. 7, pieces 601 of direction correlation power value data for stationary objects are distributed in a certain strip-shaped region (curved line) 602 in a direction-Doppler power map 600. The moving object detector 543 detects the presence of a moving object and the position of the object on the basis of a piece 603 of direction correlation power value data which is part from the strip-shaped region 602. For example, the moving object detector 543 detects first to third moving objects on the basis of three pieces $603_1$ to $603_3$ with their direction correlation power value data parting from the strip-shaped region 602, as shown in FIG. 7.

Note that a moving object detected at this time is not limited to a running vehicle. The moving object detector 543 outputs a piece of moving object position information indicating the position of a moving object to the wheel position estimator 544. Note that the position of a moving object is defined as, for example, an extent of range bin and a direction angle (hereinafter referred to as a "moving object region", as needed).

The wheel position estimator 544 determines, on the basis of a piece of local feature information stored in the information storer 541, whether a moving object region indicated by a piece of information input from the moving object detector 543 is likely to correspond to a wheel portion of a running vehicle (hereinafter simply referred to as a "wheel portion"). That is, the wheel position estimator 544 estimates a direction in which a wheel portion is present. The wheel position estimator 544 outputs a piece of information indicating the estimated direction (hereinafter referred to as a "wheel position candidate") to the vehicle identifier 545.

Note that the wheel position estimator 544 estimates a detailed range and a direction for a wheel portion of a running vehicle on the basis of a piece of moving object position information output from the moving object detector 543. More specifically, the wheel position estimator 544 checks Doppler-direction correlation power values and normalized Doppler-direction correlation values within a moving object region of pieces of direction correlation power value data and pieces of normalized direction correlation value data input from the direction-of-arrival estimator 530 against the piece of local feature information indicating a wheel feature stored in the information storer 541.

The wheel position estimator 544 performs estimation processing corresponding to the form of a piece of local feature information. That is, if a piece of local feature information is an identifier, the wheel position estimator 544 applies a parameter corresponding to the identifier to pieces of data within a moving object region and estimates a range and a direction for a wheel portion. If a piece of local feature information is a template for a data waveform, the wheel position estimator 544 may perform template matching on pieces of data within a moving object region to estimate a direction for a wheel portion.

More specifically, the wheel position estimator 544 determines whether a direction correlation power value waveform (distribution) in a band where a normalized direction correlation value is not less than a predetermined correlated value threshold (hereinafter referred to as a "high correlated value band") on the Doppler frequency axis is a characteristic waveform as described with reference to FIG. 1B. The wheel position estimator 544 determines, through the determination, whether a moving object region corresponds to a wheel and estimates the position of a wheel. The wheel position estimator 544 outputs a piece of wheel position candidate information indicating an estimated wheel position candidate to the vehicle identifier 545. A wheel position candidate is defined by, for example, a range and a direction.

The vehicle identifier 545 estimates respective positions of a plurality of wheels (hereinafter referred to as "wheel positions") on the basis of pieces of wheel position candidate information input from the wheel position estimator 544. That is, the vehicle identifier 545 compares wheel position candidates input from the wheel position estimator 544 with position ranges for a plurality of wheels of a vehicle indicated by a piece of vehicle feature information stored in the information storer 541 and detects wheel positions.

The vehicle identifier 545 estimates which ones of pieces of direction correlation power value data and pieces of normalized direction correlation value data input from the direction-of-arrival estimator 530 correspond to a vehicle body on the basis of the detected wheel positions. The vehicle identifier 545 determines whether a portion estimated as a vehicle body is a vehicle body portion, using Doppler-direction correlation power values and normalized Doppler-direction correlation values of the portion estimated as the vehicle body and a piece of local feature information for a vehicle body stored in the information storer 541.

If the vehicle identifier 545 determines that the portion is a vehicle body portion, the vehicle identifier 545 outputs a piece of position information indicating the positions of a plurality of wheels and a vehicle body to the vehicle type identifier 546. Note that such a piece of position information is a piece of information indicating that a running vehicle is present.

The vehicle type identifier 546 determines, on the basis of a piece of vehicle type feature information stored in the information storer 541, whether a running vehicle, the presence of which is indicated by a piece of information input from the vehicle identifier 545, is a predetermined vehicle type of automobile. That is, the vehicle type identifier 546 identifies the vehicle type of a detected running vehicle. The vehicle type identifier 546 outputs a piece of information indicating the estimated vehicle type to the result outputter 550 in FIG. 5.

Note that the vehicle type identifier 546 identifies the vehicle type of a running vehicle using ones corresponding to the piece of vehicle type feature information among a piece of information indicating wheel positions and pieces of direction correlation power value data and pieces of normalized direction correlation value data input from the direction-of-arrival estimator 530. That is, for example, if the piece of vehicle type feature information is one generated on the basis of the interval between two wheel positions, the ratio between the sizes of regions, and the like, the vehicle type identifier 546 identifies the vehicle type of the running vehicle using the piece of information indicating the wheel positions.

The vehicle type identifier 546 performs identification processing corresponding to the form of a piece of vehicle type feature information. That is, if a piece of vehicle type feature information is an identifier, the vehicle type identifier 546 applies a parameter corresponding to the identifier and identifies the vehicle type of a running vehicle. If a piece of vehicle type feature information is a template for arrangement of wheel positions, the vehicle type identifier 546 performs template matching on the input arrangement of wheel positions to identify the vehicle type of the running vehicle.

Note that if detection of an object position, a wheel position candidate, a wheel position, or a vehicle type is unsuccessful, the moving object detector 543, the wheel position estimator 544, the vehicle identifier 545, or the vehicle type identifier 546 may output a piece of information to that effect to the result outputter 550.

The result outputter 550 in FIG. 5 outputs a piece of information indicating a result of detection by the running vehicle detector 540, such as whether a running vehicle has been detected and the position (represented by a direction and a distance) and the vehicle type of the detected running vehicle, on the basis of a piece of information input from the running vehicle detector 540. The result outputter 550 outputs such a piece of information via, for example, a display apparatus, such as a liquid crystal display, or a sound output apparatus (not shown), such as a loudspeaker, which is arranged on a dashboard or an instrument panel of the vehicle 101 in question (see FIG. 1A).

Although not shown, the radar apparatus 200 includes, for example, a central processing unit (CPU), a storage medium, such as a read only memory (ROM), storing a control program, and a working memory, such as a random access memory (RAM). In this case, the functions of the above-described units are implemented by the CPU executing the control program.

Note that the hardware configuration of the radar apparatus 200 is not limited to the above-described one. For example, each unit of the radar apparatus 200 may be implemented as an integrated circuit (IC). Functional units may be implemented as individual chips or some or all of the functional units may be implemented as one chip.

The radar apparatus 200 with the above-described configuration can sense a running vehicle and an object other than a running vehicle distinctively from each other.

Each of pieces of information to be generated by the radar apparatus 200 will now be described in detail.

<Details of Transmit Signal>

For example, a coded pulse or a chirp pulse may be used as a baseband transmit signal to be generated by the transmit signal generator 410. In either case, a transmit signal is repeatedly transmitted in predetermined transmission cycles. A case where a coded pulse is used in the transmit signal generator 410 will be described.

The code generator 411 generates transmission codes of a code sequence Cn (n is an integer from 1 to L) with a code length L (an integer not less than 1) in each transmission cycle Tr. Each element of the code sequence Cn has, for example, either one of two values, [−1,1], or any one of four values, [1,−1,j,−j]. The symbol j represents an imaginary unit, satisfying $j^2=-1$.

A transmission code is desirably a code sequence which can achieve low side lobe performance in the radar receiver 500. Examples of such a code sequence include a code sequence constituting a pair of complementary codes, a Barker code sequence, a pseudorandom noise (PN) code, a Golay code sequence, an M-sequence code, and a code sequence constituting Spano codes. The transmission codes of the code sequence Cn will be referred to as a "transmission code Cn" below for the sake of convenience.

When the code generator 411 is to generate a pair of complementary codes (for example, a Golay code sequence or a Spano code sequence) as transmission codes Cn, the code generator 411 uses two transmission cycles (2Tr) to generate transmission codes Pn and Qn as a pair in the respective transmission cycles. That is, the code generator 411 generates a transmission code Pn which is one of the paired complementary codes in an m-th transmission cycle and generates a transmission code Qn which is the other of the paired complementary codes in a succeeding (m+1)-th transmission cycle. Similarly, the code generator 411 repeatedly generates transmission codes Pn and Qn in (m+2)-th and subsequent transmission cycles.

The modulator 412 pulse-modulates a transmission code Cn generated by the code generator 411 to generate a baseband transmit signal. More specifically, the modulator 412 performs amplitude modulation (amplitude shift keying (ASK)) or phase modulation (phase shift keying (PSK)).

Figure 8:
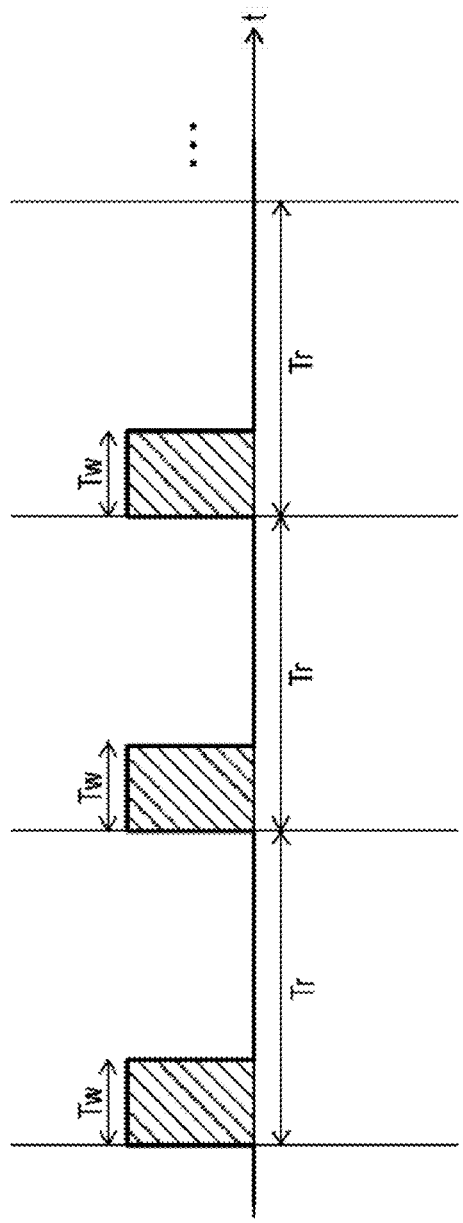
FIG. 8 shows one example of a transmission slot and a transmission cycle according to the present embodiment.
Figure 9:
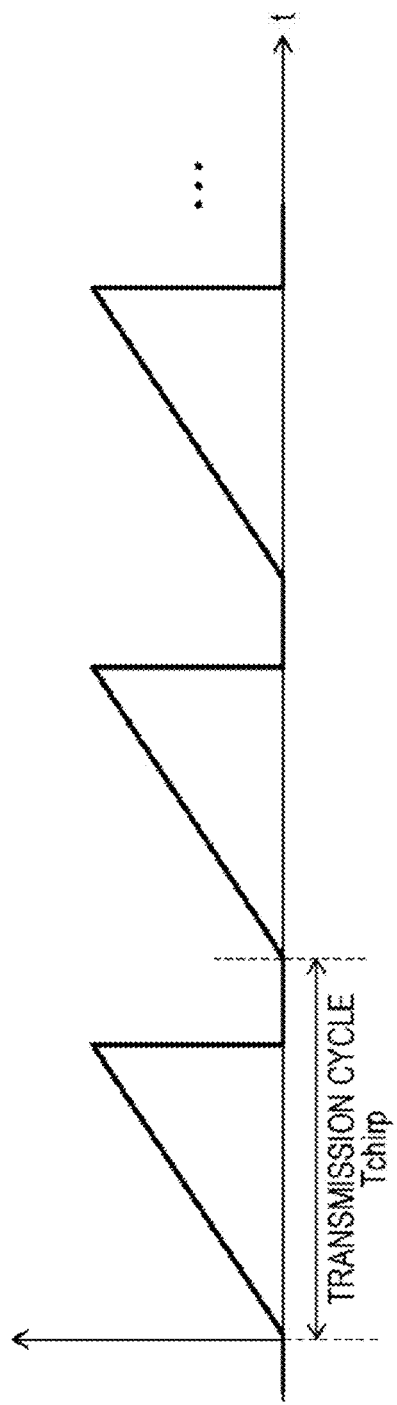
FIG. 9 shows one example of a process of frequency modulation of a transmission signal

FIG. 8 is a chart showing one example of a transmission slot and a transmission cycle for a pulse-modulated transmit signal. In FIG. 8, the vertical axis indicates frequency while the horizontal axis indicates time. Note that FIG. 9 shows one example of a case using a chirp pulse for reference.

The modulator 412 sets a transmission slot of a duration of Tw (seconds) for each transmission cycle Tr, for example. The modulator 412 performs modulation using No samples per transmission code Cn on the basis of the transmission reference clock signal generated based on the signal for reference. That is, the sampling rate of the modulator 412 is (No×L)/Tw.

The modulator 412 performs modulation using Nr (=No×L) samples during a transmission slot Tw (seconds) of a transmission cycle Tr. The modulator 412 also performs modulation using Nu samples during a no-signal slot (Tr−Tw) (seconds) of a transmission cycle Tr. Note that, as a result of the modulation, a radar signal is transmitted during a transmission slot Tw of a transmission cycle Tr while no radar signal is transmitted during a non-transmission slot (Tr−Tw).

The modulator 412 periodically generates, for example, a baseband transmit signal r(k,m) given by Equation (1) below through modulation of a transmission code Cn.

$$r(k,m)=I(k,m)\pm jQ(k,m) \quad (1)$$

In Equation (1), k represents a discrete time with respect to a time (k=1) when a transmission cycle Tr starts and takes a discrete value from 1 to (Nr+Nu). That is, k represents a time point (sampling time) when a transmit signal is generated. Also, m represents the ordinal number of a transmission cycle Tr, that is, a transmission cycle for a transmission code Cn.

That is, the transmit signal r(k,m) represents the value of a transmit signal at a discrete time k in an m-th transmission cycle Tr. More specifically, the transmit signal r(k,m) is the sum of an in-phase signal component I(k,m) and a quadrature signal component Q(k,m) multiplied by the imaginary unit j.

For example, if phase modulation (PSK) for two values, [−1,1], is employed, a code sequence Cn is subjected to binary phase shift keying (BPSK). For example, if phase modulation of four values, [1,−1,j,−j], is employed, a code sequence Cn is subjected to quadrature phase shift keying (QPSK) or four-phase PSK. That is, in the case of phase modulation (PSK), predetermined modulation symbols in a constellation on the plane are assigned.

<Relative Positional Relationship Among Receiving Antenna Elements>

The relative positional relationship among the first to fourth receiving antennas $511_1$ to $511_4$ is determined in advance and is already known.

Figure 10:
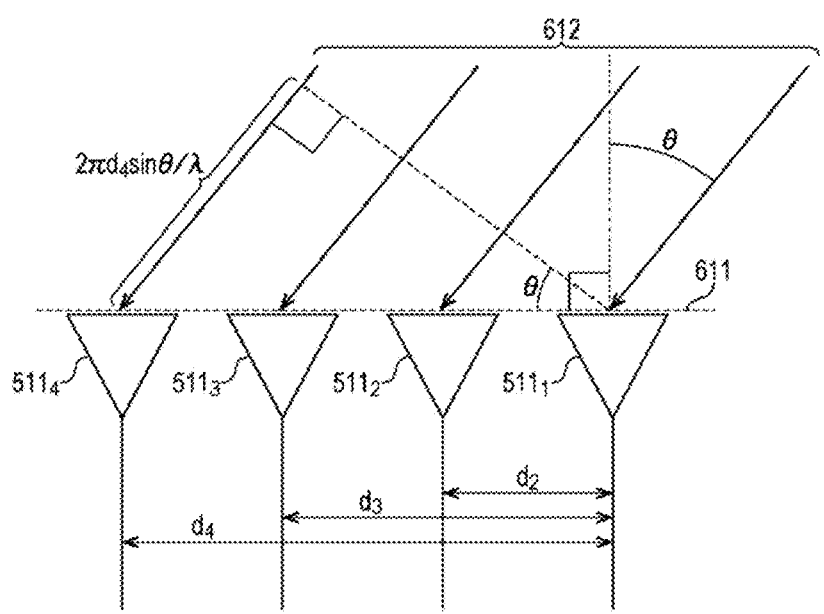
FIG. 10 shows one example of the relative positional relationship among a plurality of receiving antenna elements according to the present embodiment.

FIG. 10 is a diagram showing one example of the relative positional relationship among the first to fourth receiving antenna elements $511_1$ to $511_4$.

As shown in FIG. 10, the first to fourth receiving antenna elements $511_1$ to $511_4$ are arranged, for example, in this order along a certain straight line 611. Let $d_2$ be a distance between the first receiving antenna element $511_1$ and the second receiving antenna element $511_2$; $d_3$ be a distance between the first receiving antenna element $511_1$ and the third receiving antenna element $511_3$; and $d_4$ be a distance between the first receiving antenna element $511_1$ and the fourth receiving antenna element $511_4$.

Assume that echo signals 612 with a wavelength of λ, arrive from a direction at a direction angle θ with respect to a direction vertical to the straight line 611 under the above-described arrangement. Letting $d_i$ be a distance of an i-th receiving antenna element $511_i$ from the first receiving antenna element $511_1$, a phase difference (inter-antenna phase difference) between a receive signal from the i-th receiving antenna element $511_i$ and a receive signal from the first receiving antenna element $511_1$ is $2\pi f d_i \sin\theta/c = 2\pi d_i \sin\theta/\lambda$. In the equation, c is a propagation velocity, f is the frequency of an echo signal (radar signal), and λ, is the wavelength of the echo signal. For example, as shown in FIG. 10, a phase difference of a received signal of the fourth receiving antenna 511$_4$ from a receive signal of the first receiving antenna 511$_1$ is 2πd$_4$ sin θ/λ.

<Piece of Delay Profile Data>

The delay profile generator 512 samples an input receive signal at each predetermined discrete time (for each range bin). The delay profile generator 512 calculates a piece of in-phase (I) data which is an in-phase signal of a sampled signal and a piece of quadrature (Q) data which is a quadrature signal. The distance from the radar apparatus 200 and the reflection intensity of an object as a reflector of a radar signal, and a piece of phase information and power of a receive signal from the object can be obtained from a piece of I data and a piece of Q data (hereinafter referred to as "pieces of data") for each range bin.

Note that the delay profile generator 512 adds, for each range bin, a piece of I data and a piece of Q data which are a result of the above-described sampling, a predetermined number of times (the addition is called "coherent additions") to obtain pieces of I data and pieces of Q data for one cycle. The coherent addition suppresses white noise. The delay profile generator 512 obtains the above-described pieces of data for each repetitive waveform, that is, each cycle of an echo signal.

In the description below, a piece of data corresponding to a k-th range bin in an m-th cycle is represented by CI(m,k). The piece CI(m,k) of data is given by, for example, Equation (2) below:

$$CI(m,k)=CI\_I(m,k)+CI\_Q(m,k) \quad (2)$$

In Equation (2), CI_I(m,k) is an in-phase signal and is a real component of the piece CI(m,k) of data. Also, CI_Q(m,k) is a quadrature signal and is an imaginary component of the piece CI(m,k) of data. The symbol k represents a range bin number and takes an integer of 1, 2, . . . , K. The symbol K represents the maximum value of the range bin number. That is, a maximum distance which can be measured by the radar apparatus 200 is determined by the value of K.

The delay profile generator 512 outputs a series of pieces of data acquired for respective combinations of cycles and range bins as pieces of delay profile data.

Figure 12:
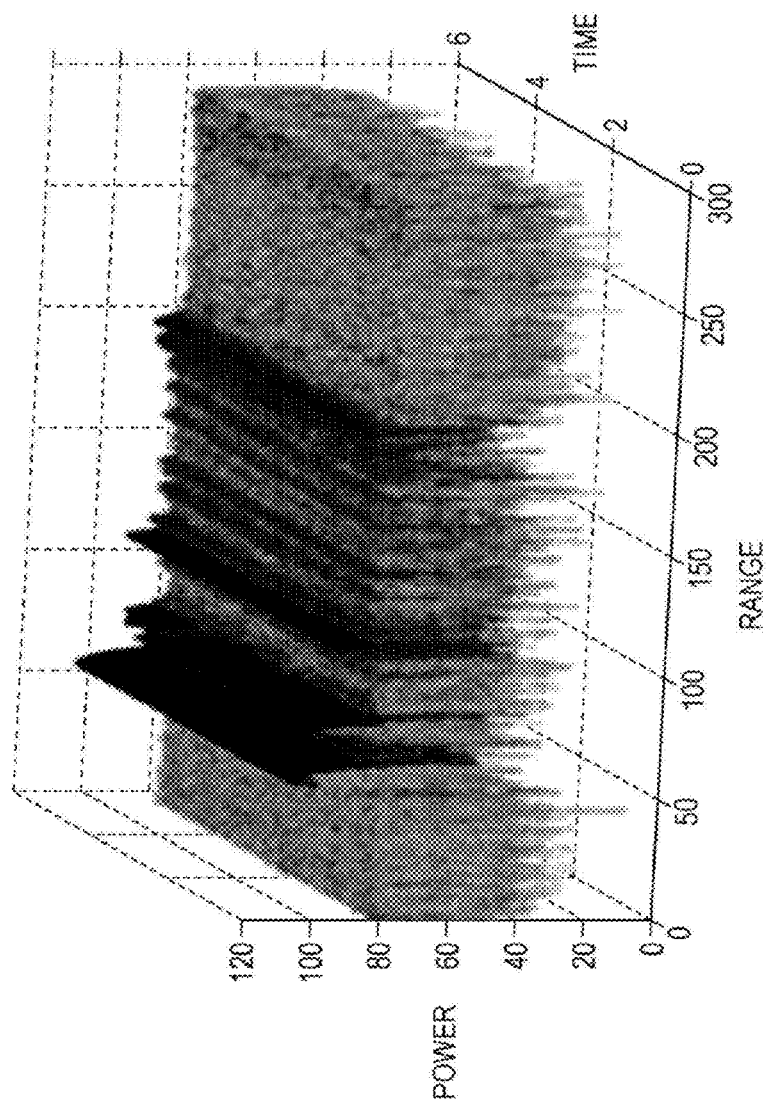
FIG. 12 shows one example of a three-dimensional graph of the delay profile data according to the present embodiment.

FIG. 11 is a chart showing one example of the configuration of delay profile data to be output by the delay profile generator 512. FIG. 12 is a chart showing one example of a three-dimensional graph of the delay profile data. In FIG. 12, the horizontal axis indicates distance (range bin), the depth axis represents time (cycles), and the vertical axis indicates the power ($\log_{10}(I^2+Q^2)$) of a corresponding component of a receive signal.

As shown in FIG. 11, delay profile data 620 has pieces CI(m,1) to CI(m,K) of data for first to K-th range bins for each cycle. As can be seen from a three-dimensional graph 621 shown in FIG. 12, the delay profile data 620 is a piece of data indicating spatial variations and temporal variations in power.

As for the delay profile data 620, each time a piece of the delay profile data 620 for one cycle is generated, the generated piece of the delay profile data 620 (for example, pieces CI(1,1) to CI(1,K) of data for the first to K-th range bins for a first cycle) for one cycle is output to the Doppler frequency acquirer 520.

Note that, as output pieces of the delay profile data 620, pieces CI(1,1) to CI(M,K) of data for M continuous cycles are processed as one unit (hereinafter referred to as a "frame") in the downstream Doppler frequency acquirer 520.

<Piece of Doppler Frequency Data>

The Doppler frequency analyzer 521 bundles input pieces of the delay profile data 620 (see FIG. 11) for each frame (that is, each set of pieces of data for the continuous M cycles) together and performs Doppler frequency analysis. That is, the Doppler frequency analyzer 521 performs Doppler frequency analysis on, for example, pieces CI(1,k), CI(2,k), . . . , CI(M,k) of data for the continuous M cycles for the k-th range bin.

Figure 13:
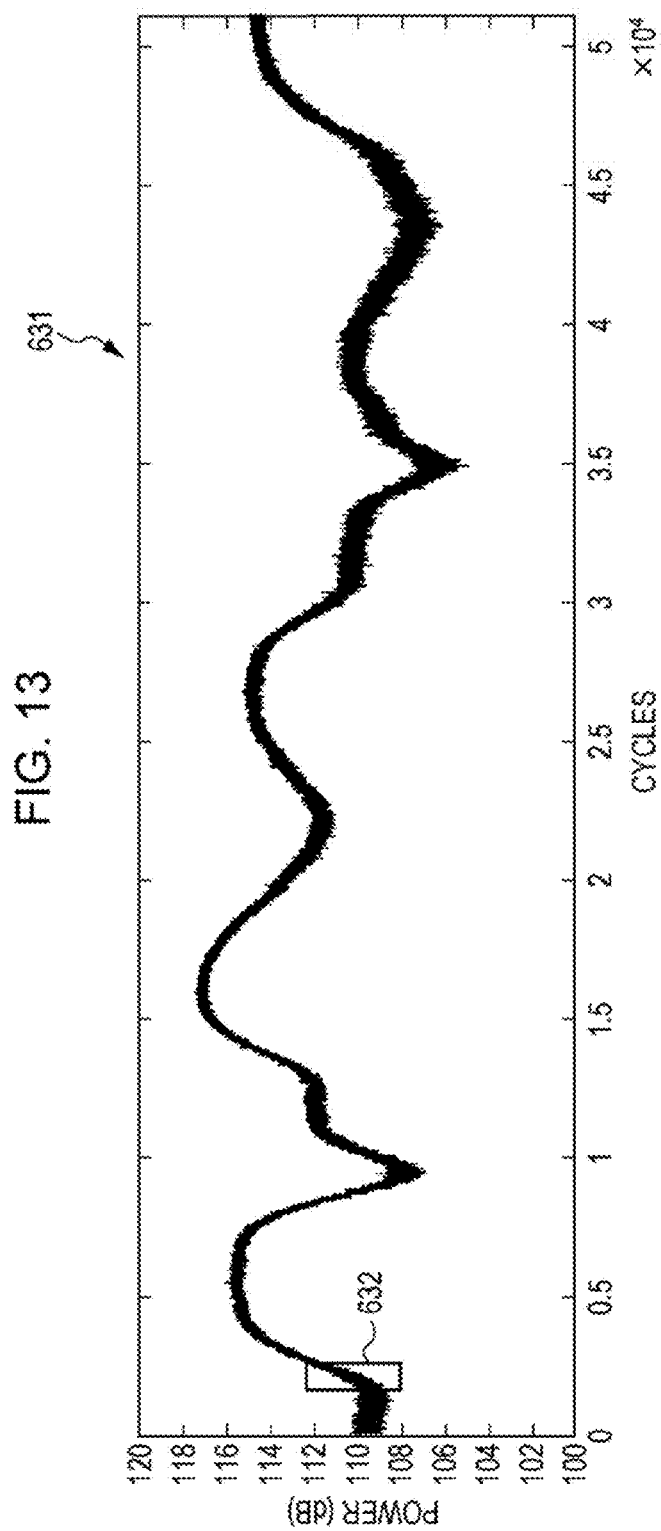
FIG. 13 shows one example of a two-dimensional graph of delay profile data according to the present embodiment.
Figure 14:
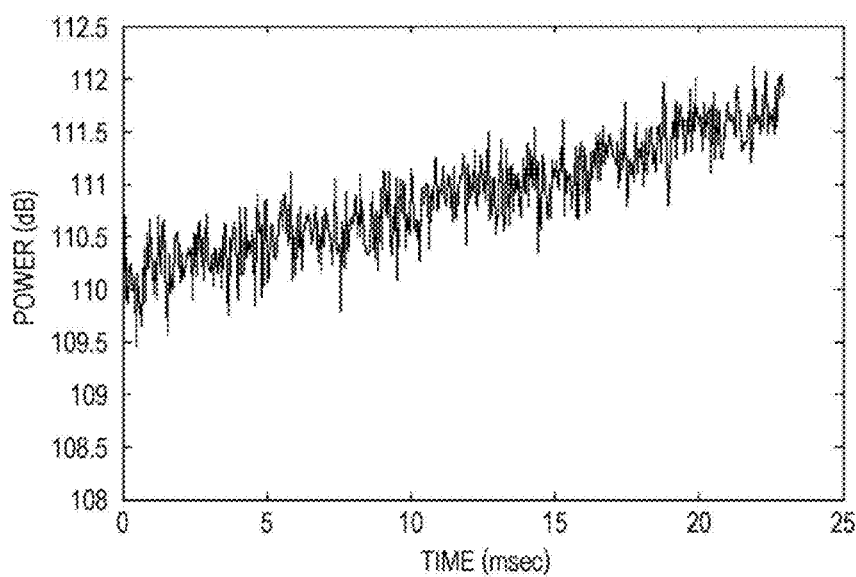
FIG. 14 shows, on an enlarged scale, a portion of the two-dimensional graph shown in FIG. 13 according to the present embodiment.

FIG. 13 is a chart showing one example of a two-dimensional graph of pieces of data for the k-th range bin corresponding to a range where an object in motion is located among pieces of delay profile data as a Doppler frequency analysis target. FIG. 13 shows pieces of data for 51200 cycles (about 2.5 seconds). FIG. 14 is an enlarged chart of a portion 632 of the two-dimensional graph shown in FIG. 13. FIG. 14 shows pieces of data for 512 cycles (0.025 seconds). In each of FIGS. 13 and 14, the horizontal axis indicates cycles (time) while the vertical axis indicates power (data) of a corresponding component of a receive signal.

As shown in FIG. 13, in delay profile data 631, a piece of data for the k-th range bin varies greatly over time. The variation is involved in the motion of an object. As can be seen from FIG. 14 that is obtained by enlarging the portion 632 corresponding to a slot of 512 cycles, the piece of data fluctuates finely. The fine fluctuation is due to a fine motion of the object or fading.

The Doppler frequency analyzer 521 can extract not only a velocity component which is produced in connection with movement of an object but also a velocity component which is produced in connection with a feature of the above-described fine motion of an object through Doppler frequency analysis. Note that an extractable step size for a Doppler frequency component depends on the duration of one cycle and the number of cycles included in one frame used in frequency analysis.

For example, a digital Fourier transform (DFT) can be adopted as a Doppler frequency analysis method. A DFT can be computed at high speed on a computer by the algorithm of a fast Fourier transform (FFT).

Figure 15:
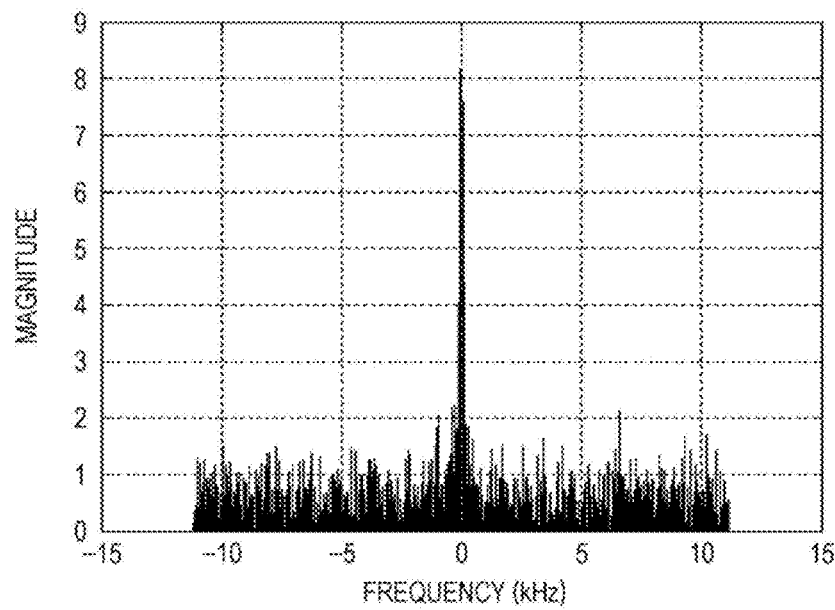
FIG. 15 shows one example of a result of FFT processing of pieces of delay profile data according to the present embodiment.

FIG. 15 is a chart showing one example of a result of processing pieces of data for 512 cycles for the k-th range bin shown in FIG. 14 by an FFT. In FIG. 15, the horizontal axis indicates frequency (Doppler frequency) while the vertical axis indicates magnitude (power or Doppler frequency component).

If a DFT is used, the Doppler frequency analyzer 521 performs an arithmetic operation using complex number with the above-described CI_I(m,k) as a real component and the above-described CI_Q(m,k) as an imaginary component. A Doppler frequency component Fd(n,k) for a Doppler frequency numbered n for the k-th range bin is calculated using, for example, Equation (3) below:

$$Fd(n,k) = \sum_{m=1}^{M} \left( CI(m,k) e^{-j\frac{2\pi(n-1)(m-1)}{M}} \right) \quad (3)$$

In Equation (3), n is the number of a Doppler frequency and takes, for example, a value of 1, 2, . . . , M. The symbol M represents the number of a maximum Doppler frequency which the radar apparatus 200 can measure. The Doppler frequency component Fd(n,k) indicates a velocity component (expressed as a complex number) corresponding to the Doppler frequency numbered n of a receive signal from a position at a distance represented by k×range step size.

In the above-described manner, the Doppler frequency analyzer 521 performs Doppler frequency analysis on pieces of data for the k-th range bin for one frame, that is, the M cycles (CI(1,k), CI(2,k), . . . , CI(M,k)). As a result, M Doppler frequency components (Fd(1,k), Fd(2,k), . . . , Fd(M,k)) are obtained for each range bin.

Note that a step size Δf for an obtained Doppler frequency component depends on the number M of cycles for one frame and a cycle interval Δt. If Doppler frequency analysis is performed using a DFT, the step size Δf for a Doppler frequency component is given by, for example, Equation (4) below:

$$\Delta f = \frac{1}{M * \Delta t} \quad (4)$$

The Doppler frequency analyzer 521 can obtain the Doppler velocity of an object from the Doppler frequency component step size Δf using, for example, Equation (5) below:

$$\Delta v = \frac{\lambda}{2} * \Delta f \quad (5)$$

The Doppler frequency analyzer 521 outputs a series of pieces of data calculated for respective combinations of range bins and Doppler frequencies (that is, respective combinations of distances and velocities) as pieces of Doppler frequency data.

FIG. 16 is a chart showing one example of the configuration of Doppler frequency data to be output by the Doppler frequency analyzer 521.

As shown in FIG. 16, Doppler frequency data 640 has Doppler frequency components Fd(1,k) to Fd(M,k) for first to M-th Doppler frequencies for each range bin. That is, a piece of the Doppler frequency data 640 for each range bin is a piece of data indicating variations in power with respect to Doppler frequency, as shown in FIG. 15 described above.

<Normalized Direction Correlation Value and Direction Correlation Power Value>

Let $Fd_i(n,k)$ be a Doppler frequency component output from an i-th Doppler frequency analyzer 521i. Doppler frequency components $Fd_1(n,k)$ to $Fd_4(n,k)$ corresponding to the first to fourth receiving antenna elements $511_1$ to $511_4$ for each combination of a Doppler frequency and a range bin are represented as a correlation vector h(n,k). The correlation vector h(n,k) is given by Equation (6) below:

$$h(n, k) = \begin{bmatrix} Fd_1(n, k) \\ Fd_2(n, k) \\ Fd_3(n, k) \\ Fd_4(n, k) \end{bmatrix} \quad (6)$$

The direction-of-arrival estimator 530 estimates a direction angle θ (see FIG. 10) indicating a direction of arrival of an echo signal on the basis of the correlation vector h(n,k).

As described above, a phase difference between a receive signal from the i-th receiving antenna element $511_i$ and a receive signal from the first receiving antenna element $511_1$ is $2\pi d_i \sin \theta/\lambda$. Complex responses of the first to fourth receiving antenna elements $511_1$ to $511_4$ of the array antenna for each direction angle $\theta_u$ of interest are represented using a direction vector $a(\theta_u)$. The ideal direction vector $a(\theta_u)$ with no phase deviation and no amplitude deviation between the receiving antennas 511 is given by Equation (7) below:

$$a(\theta_u) = \begin{bmatrix} 1 \\ e^{j2\pi d_2 \sin\theta_u/\lambda} \\ e^{j2\pi d_3 \sin\theta_u/\lambda} \\ e^{j2\pi d_4 \sin\theta_u/\lambda} \end{bmatrix} \quad (7)$$

In Equation (7), $\theta_u$ is a direction angle relative to the radar apparatus 200 and is a variable which changes in steps of a predetermined interval Δθ within an estimated scope ($\theta_{min}$ to $\theta_{max}$) for a direction of arrival of an echo signal in the radar apparatus 200. The direction angle $\theta_u$ is given by, for example, Equation (8) below:

$$\theta_u = \theta_{min} + u\Delta\theta \quad (8)$$

In Equation (8), u takes an integer from 0 to NU. The symbol NU is given by, for example, Equation (9) below:

$$NU = \text{floor}\left[\frac{\theta_{max} - \theta_{min}}{\Delta\theta}\right] \quad (9)$$

In Equation (9), floor[y] is a function which outputs a maximum integer value not more than a real number y.

The direction vector $a(\theta_u)$ is measured in advance in, for example, an anechoic chamber. The direction vector $a(\theta_u)$ may be a value obtained by adding coupling between antenna elements and pieces of deviation information, such as an amplitude error and a phase error, to a piece of phase difference information geometrically computed in accordance with the intervals between the first to fourth receiving antenna elements $511_1$ to $511_4$.

The normalized direction correlation value calculator 532 calculates a normalized direction correlation value $N\_R_{out}(k,n,\theta_u)$ using, for example, Equation (10) below for each combination of the direction angle $\theta_u$, a range bin, and a Doppler frequency. The direction correlation power value calculator 531 also calculates a direction correlation power value $F_{out}(k,n,\theta_u)$ using, for example, Equation (11) below for each combination of the direction angle $\theta_u$, a range bin, and a Doppler frequency.

$$N\_R_{out}(k, n, \theta_u) = \frac{|a(\theta_u)^H k(k, n)|^2 / a(\theta_u)^H a(\theta_u)}{h(k, n)^H h(k, n)} \quad (10)$$

$$\text{if } N\_R_{out}(k, n, \theta_u) > Th1, F_{out}(k, n, \theta_u) = |a(\theta_u)^H k(k, n)|^2 \quad (11)$$
$$\text{else } F_{out}(k, n, \theta_u) = 0$$

As can be seen from Equation (10), the normalized direction correlation value $N\_R_{out}(k,n,\theta_u)$ is a value obtained by normalizing the inner product of the direction vector $a(\theta_u)$ and the correlation vector h(n,k) by the value of the 2-norm of the correlation vector h(n,k). The normalized direction correlation value $N\_R_{out}(k,n,\theta_u)$ takes a real number from 0 to 1. The normalized direction correlation value $N\_R_{out}(k,n,\theta_u)$ closer to 1 indicates a higher degree of correlation between the correlation vector h(n,k) and the direction vector $a(\theta_u)$. That is, in the case of a 1-wave model (a case where only one frequency n is assumed to be present in the range bin k), the normalized direction correlation value $N\_R_{out}(k,n,\theta_u)$ indicates the likelihood (conviction degree) that an echo signal of the frequency n arrives from the direction angle $\theta_u$.

As can be seen from Equation (11), if the normalized direction correlation value is larger than a threshold Th1, the direction correlation power value $F_{out}(k,n,\theta_u)$ is the square of the inner product of the direction vector $a(\theta_u)$ and the correlation vector h(n,k). The direction correlation power value $F_{out}(k,n,\theta_u)$ in this case indicates the power value of an echo signal of the frequency numbered n which arrives from a direction at the direction angle $\theta_u$ coupled with the degree of correlation between the correlation vector h(n,k) and the direction vector $a(\theta_u)$.

The direction correlation power value calculator 531 outputs a calculated series of direction correlation power values $F_{out}(k,n,\theta_u)$ as pieces of direction correlation power value data to the running vehicle detector 540. The normalized direction correlation value calculator 532 outputs a calculated series of normalized direction correlation values $N\_R_{out}(k,n,\theta_u)$ as pieces of normalized direction correlation value data to the running vehicle detector 540.

Figure 17:
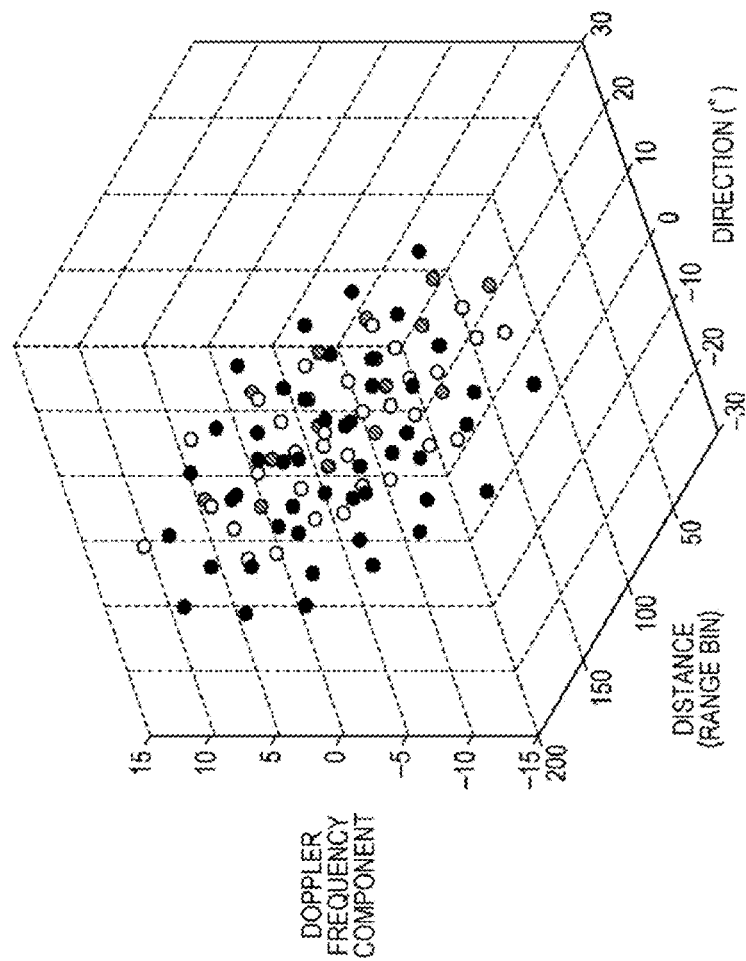
FIG. 17 shows one example of a three-dimensional plot of normalized direction correlation value data according to the present embodiment.

FIG. 17 is a chart showing one example of a three-dimensional plot of normalized direction correlation value data. In FIG. 17, the color density of a dot indicates the magnitude of the normalized direction correlation value $N\_R_{out}(k,n,\theta_u)$. A dot of a darker color indicates a higher normalized direction correlation value $N\_R_{out}(k,n,\theta_u)$.

As shown in FIG. 17, normalized direction correlation value data 650 has the normalized direction correlation value $N\_R_{out}(k,n,\theta_u)$ for each combination of a distance (range bin) (k), the direction angle $\theta_u$, and a Doppler frequency (n). Note that normalized direction correlation values $N\_R_{out}(k,n,\theta_u)$ not more than a predetermined value are not shown in FIG. 17. As described above, normalized direction correlation values $N\_R_{out}(k,n,\theta_u)$ are composed of an array of K×M×(NU+1) normalized direction correlation values (see Equation (9) for NU).

Note that direction correlation power value data is also composed of an array of K×M×(NU+1) direction correlation power values.

<Features of Piece of Normalized Direction Correlation Value Data and Piece of Direction Correlation Power Value Data>

Figure 18:
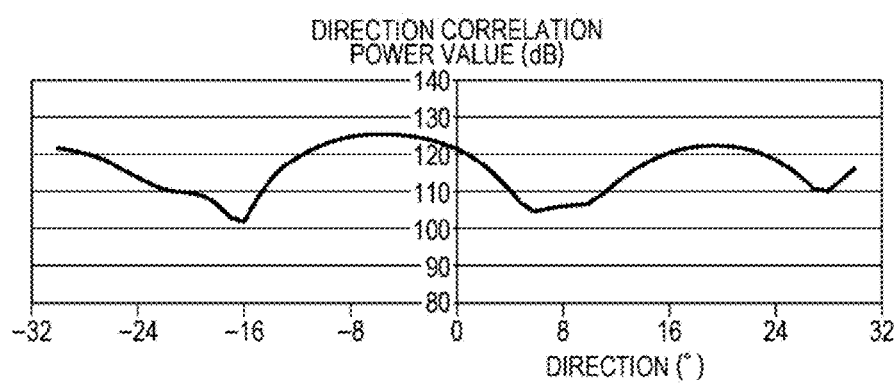
FIG. 18 shows one example of the relationship between direction and direction correlation power value for a maximum power Doppler frequency component in a range bin where an object is located, according to the present embodiment.
Figure 19:
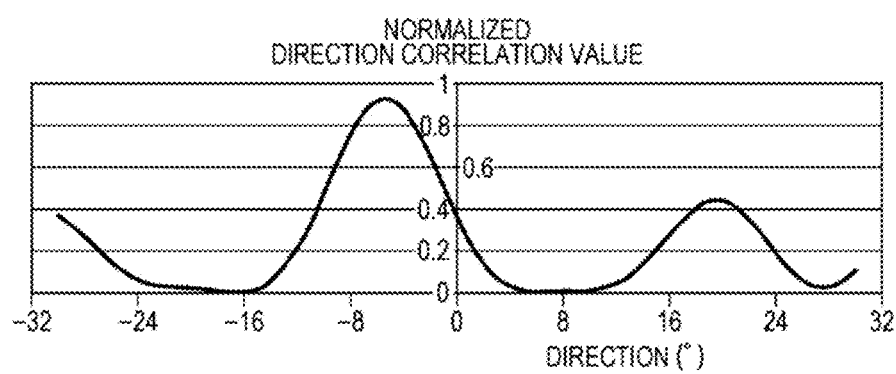
FIG. 19 shows one example of the relationship between direction and normalized direction correlation value for a maximum power Doppler frequency component in a range bin where an object is located, according to the present embodiment.

FIG. 18 is a chart showing one example of the relationship between direction and direction correlation power value for a maximum power Doppler frequency component at a distance (in a range bin) where an object is located. FIG. 19 is a chart showing one example of the relationship between direction and normalized direction correlation value for the maximum power Doppler frequency component at the distance (in the range bin) where the object is located.

In FIG. 18, the horizontal axis indicates direction while the vertical axis indicates direction correlation power value. In FIG. 19, the horizontal axis indicates direction while the vertical axis indicates normalized direction correlation value.

In FIG. 18, the direction correlation power value of the maximum power Doppler frequency component peaks around a direction of −5°. However, since a waveform of the direction correlation power value is not sharp, the direction of arrival of an echo signal can be estimated only roughly.

In contrast, in FIG. 19, the normalized direction correlation value of the maximum power Doppler frequency component peaks around the direction of −5° with a sharp waveform. As described above, a piece of normalized direction correlation value data characteristically indicates the direction of arrival of an echo signal with high accuracy.

<Features of Piece of Direction Correlation Power Value Data and Piece of Normalized Direction Correlation Value Data for Each Object>

A waveform of a piece of direction correlation power value data and a waveform of a piece of normalized direction correlation value data depend on whether a portion as a reflector of a radar signal is a vehicle or a person, whether the portion is a wheel portion of a running vehicle or a vehicle body portion, and whether the portion is a front wheel of a running vehicle located behind a vehicle in question or a rear wheel.

Differences in feature between a piece of direction correlation power value data and a piece of normalized direction correlation value data of each portion (hereinafter referred to as an "object") as a reflector of a radar signal will be described. Note that, in the description below, the term cell refers to one of small regions, into which an area as a running vehicle sensing target for the radar apparatus 200 are divided, and, for example, to a region defined by a combination of a range bin (k) and a direction angle (θ).

Figure 20:
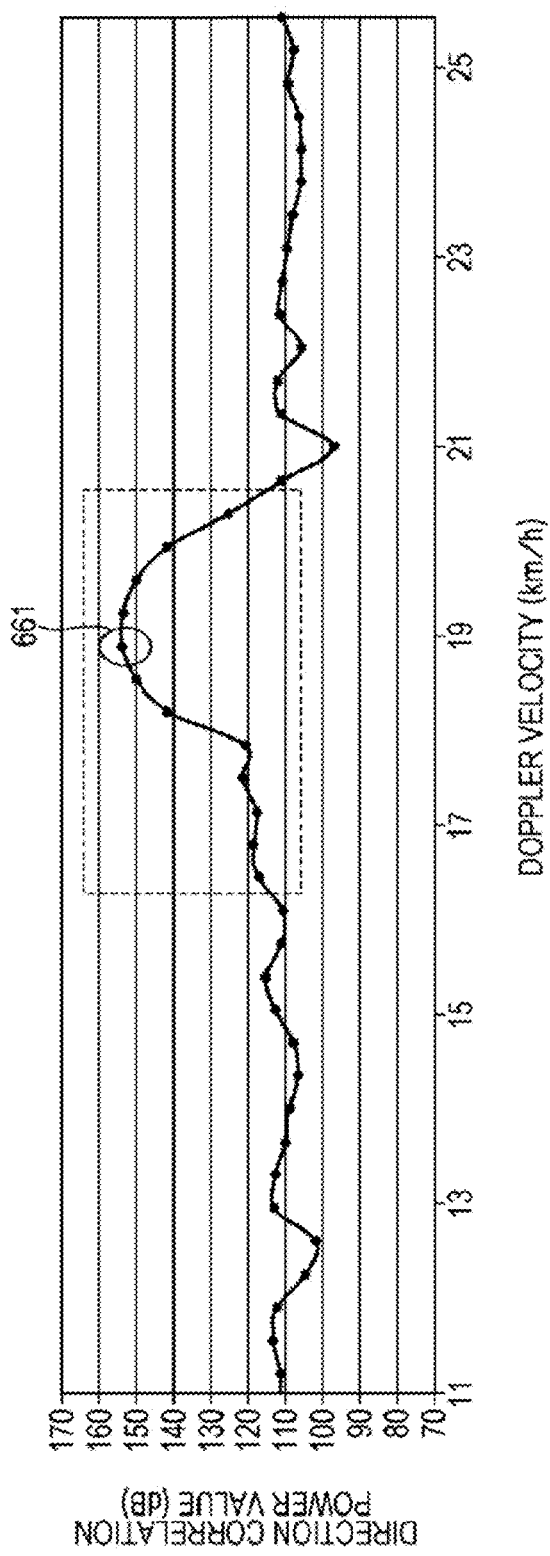
FIG. 20 shows one example of the relationship between Doppler velocity and direction correlation power value for a vehicle body portion cell of a running vehicle, according to the present embodiment.
Figure 21:
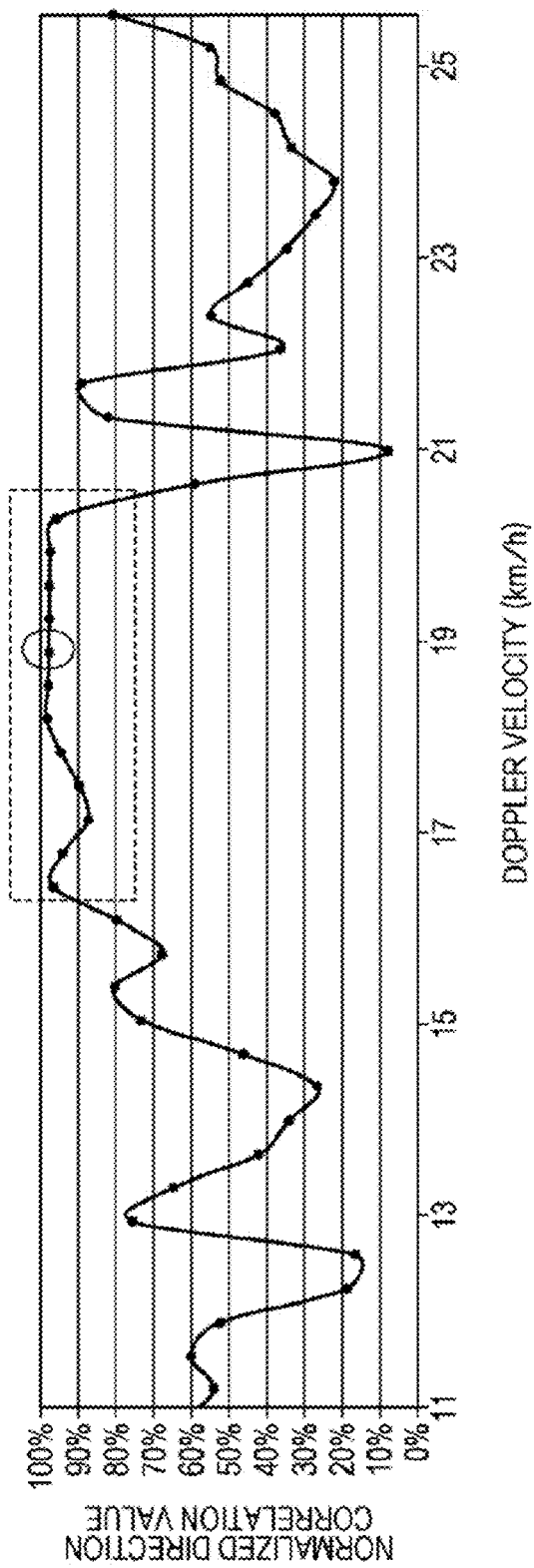
FIG. 21 shows one example of the relationship between Doppler velocity and normalized direction correlation value for the vehicle body portion cell of the running vehicle, according to the present embodiment.

FIG. 20 is a chart showing one example of a piece of direction correlation power value data for a cell (hereinafter referred to as a "vehicle body portion cell") to which a vehicle body portion, not including a wheel portion, of a running vehicle located behind a vehicle in question belongs. In FIG. 20, the horizontal axis indicates Doppler velocity (km/h) while the vertical axis indicates direction correlation power value (dB). FIG. 21 is a chart showing one example of a piece of normalized direction correlation value data for the vehicle body portion cell, corresponding to FIG. 20. In FIG. 21, the horizontal axis indicates Doppler velocity (km/h) while the vertical axis indicates normalized direction correlation value.

As can be seen from FIGS. 20 and 21, if a threshold for the normalized direction correlation value is set at 80%, the spread width of the Doppler velocity of a reflecting object is 3.85 (=20.3−16.45) km/h.

A point surrounded by a circle 661 in FIG. 20 indicates a Doppler component with a maximum power value which has a Doppler velocity of 18.9 km/h. Doppler components which have Doppler velocities higher than the Doppler velocity and have normalized direction correlation values higher than the threshold (80%) are components with Doppler velocities of 19.25 to 20.3 km/h, and the spread width of the Doppler velocities is only 1.05 km/h.

Figure 22:
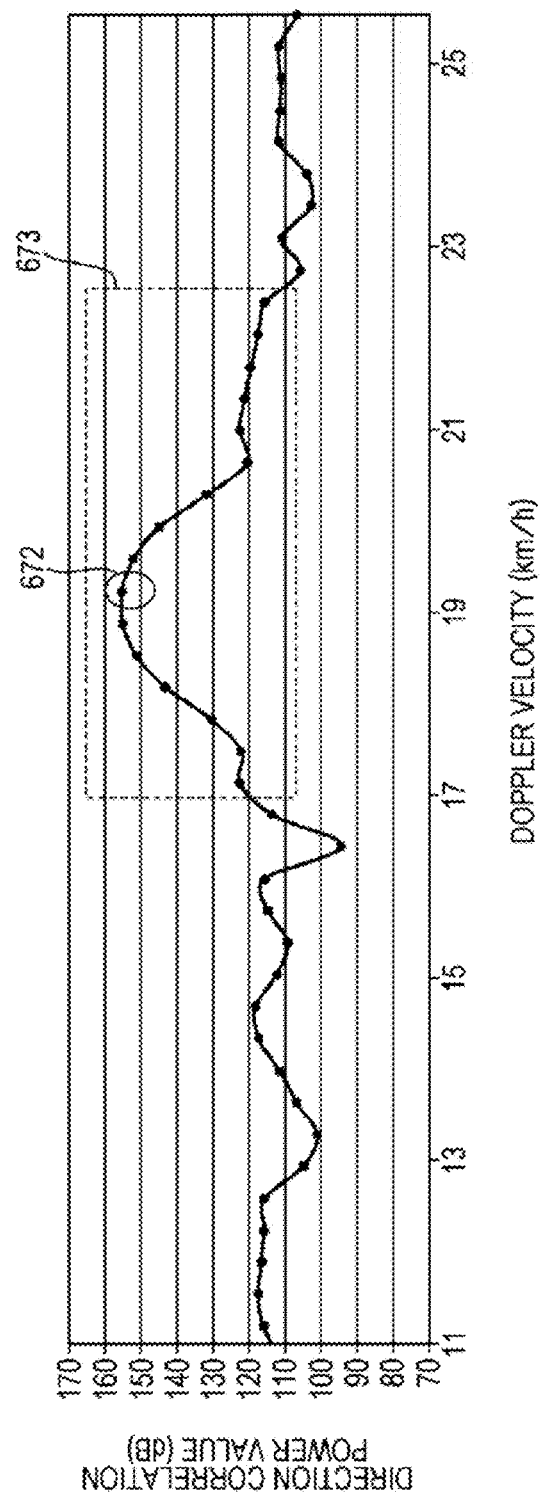
FIG. 22 shows one example of the relationship between Doppler velocity and direction correlation power value for a front wheel portion cell of a running vehicle behind, according to the present embodiment.
Figure 23:
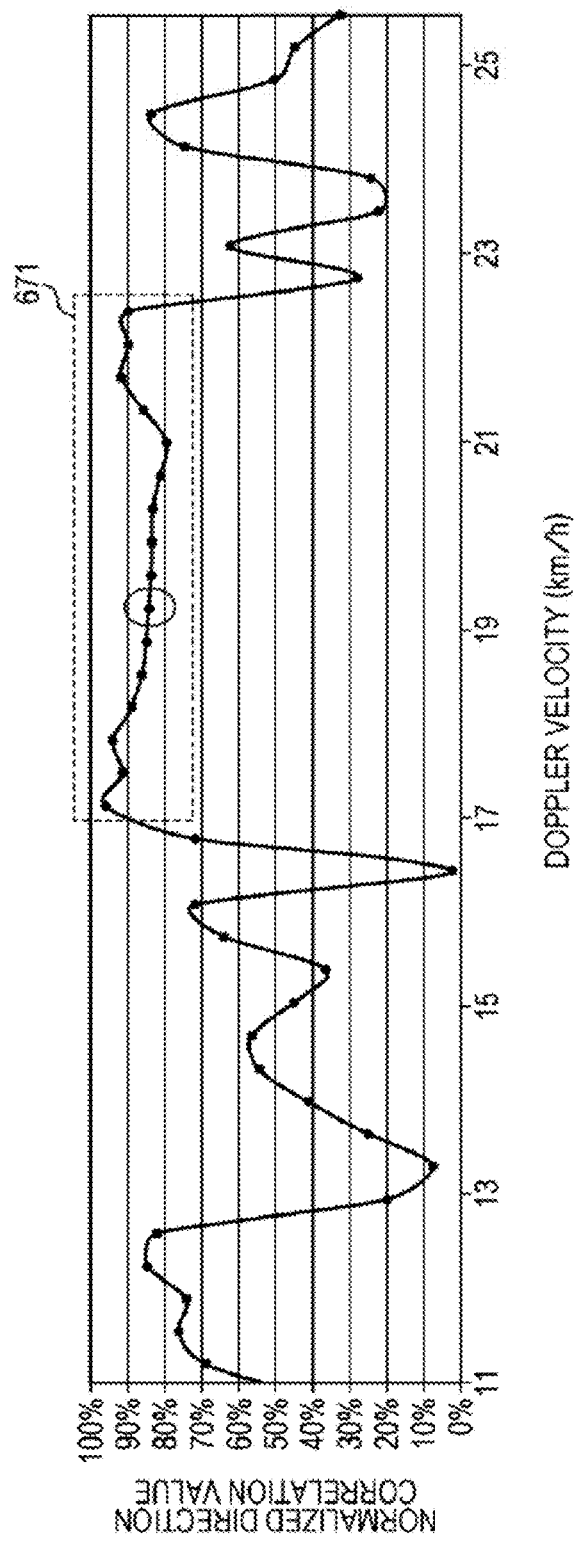
FIG. 23 shows one example of the relationship between Doppler velocity and normalized direction correlation value for the front wheel portion cell of the running vehicle behind, according to the present embodiment.

In contrast, FIG. 22 is a chart showing one example of a piece of direction correlation power value data for a cell (hereinafter referred to as a "front wheel portion cell") to which a portion including a front wheel portion of a running vehicle located behind a vehicle in question belongs. FIG. 23 is a chart showing one example of a piece of normalized direction correlation value data for the front wheel portion cell corresponding to FIG. 22. As can be seen from FIGS. 22 and 23, if a threshold for the normalized direction correlation value is set at 80%, the spread width of the Doppler velocity of a reflecting object surrounded by a dotted line 671 is 5.25 (=22.4−17.15) km/h.

A point surrounded by a circle 672 in FIG. 22 is a Doppler component with a maximum power value which has a Doppler velocity of 19.25 km/h. Doppler components which have Doppler velocities higher than the Doppler velocity and have normalized direction correlation values higher than the threshold (80%) are components with Doppler velocities of 19.6 to 22.4 km/h, and the spread width of the Doppler velocities is as wide as 2.8 km/h.

As shown in FIGS. 22 and 23, the power values of several Doppler components on the most right side in a high Doppler velocity region 673 with normalized direction correlation values higher than the threshold (80%) decrease gently toward a rightmost one. More specifically, the Doppler components are Doppler velocity components at five points on the most right side (that is, components with Doppler velocities of 21 to 22.4 km/h). In numerical representation, the variance of variations of the power values at the five points (differences from the power value of a Doppler component on the left side) is less than a threshold of 3. Additionally, the average of the difference values is a smaller minus value, and the absolute value of the average value is less than a threshold value of 4.

Note that the number of several Doppler components on the most right side within a Doppler scope indicated by the dotted line 673 can be determined on the basis of the absolute velocity (estimated from a Doppler velocity with a maximum power value representing the relative velocity of a vehicle body and the velocity of the vehicle in question) of the vehicle. This is because a vehicle velocity is determined from the radius and turning angle velocity of a wheel. For example, if the vehicle velocity is 20 km/h, the width of Doppler spreading caused by rotating of a wheel is about 1.5 km/h.

As described with reference to FIG. 2, a Doppler component of a wheel of a running vehicle appears characteristically as a radial component which is the relative velocity of each part of the rotating wheel to a radar. A part at a wheel front has a low Doppler velocity but has high reflection intensity. In contrast, an upper part of the wheel has a small reflection sectional area and low reflection intensity but has a high velocity in a radar radial direction. For this reason, a characteristic phenomenon in which a power value decreases gently with increase in velocity appears as a wheel Doppler feature.

Figure 24:
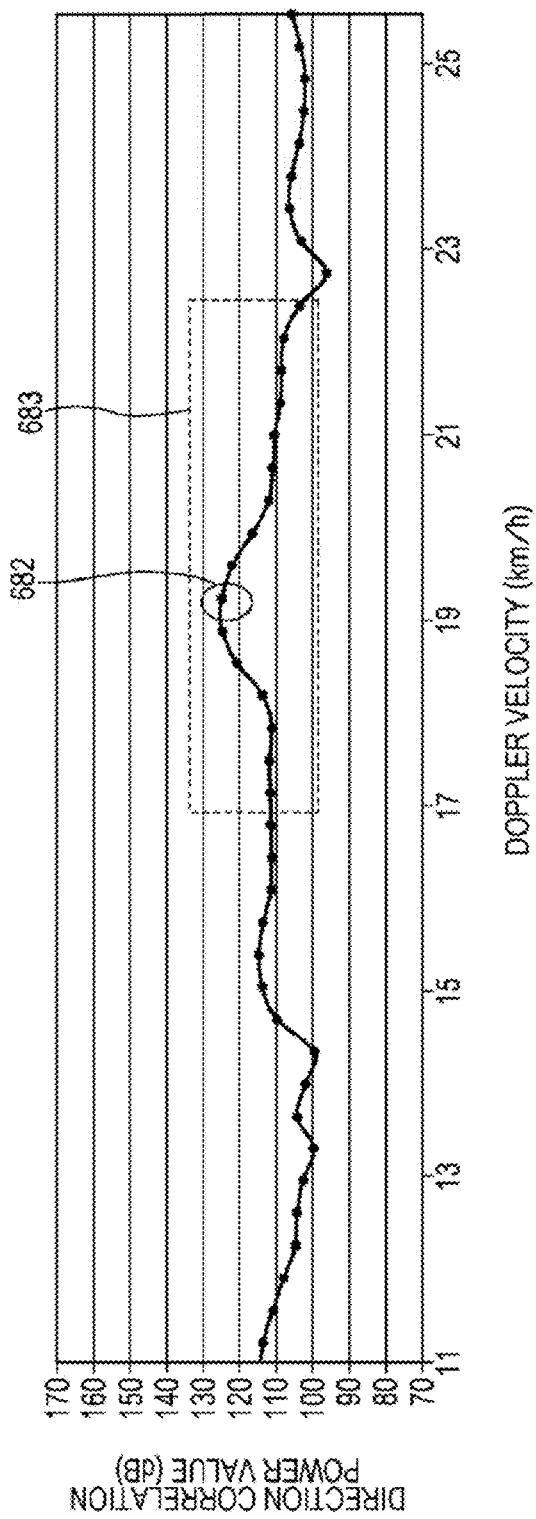
FIG. 24 shows one example of the relationship between Doppler velocity and direction correlation power value for a rear wheel portion cell of a running vehicle behind, according to the present embodiment.
Figure 25:
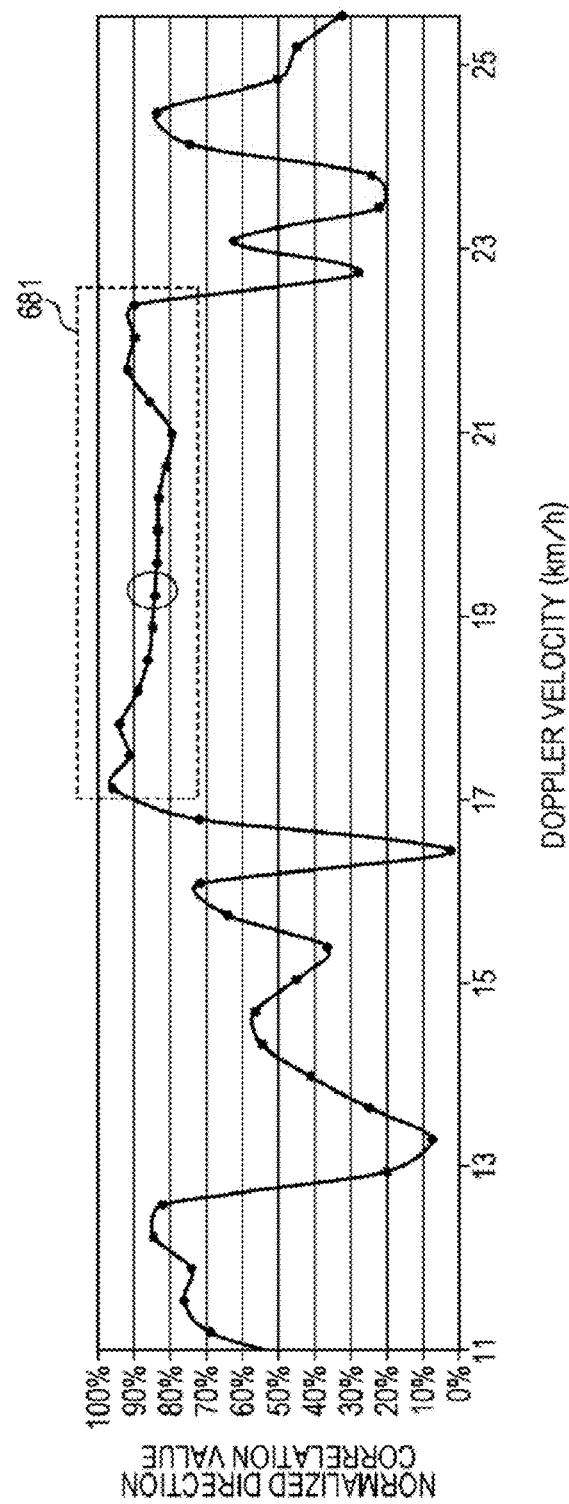
FIG. 25 shows one example of the relationship between Doppler velocity and normalized direction correlation value for the rear wheel portion cell of the running vehicle behind, according to the present embodiment.

The above-described features of a wheel are also observed from pieces of data on a rear wheel of a running vehicle located behind a vehicle in question. FIG. 24 is a graph showing one example of a Doppler-direction correlation power value of a part including a rear wheel of a running vehicle. FIG. 25 is a Doppler-normalized direction correlation value graph corresponding to FIG. 24.

As can be seen from FIG. 25, if a threshold for the normalized direction correlation value is set at, for example, 80%, the spread width of the Doppler velocity of a reflecting object surrounded by a dotted line 681 is 5.25 (=22.4−17.15) km/h.

In the case of a rear wheel, since the rear wheel is partly hidden, a reflection sectional area is smaller than that of a front wheel, and reflection intensity is lower. For this reason, the power value of a corresponding Doppler component is smaller than in the case of a front wheel. However, as can be seen from FIG. 24, a Doppler component (at a point surrounded by a circle 682) with maximum reflection power has a Doppler velocity of 19.25 km/h, as in the case of a front wheel. Doppler components which have Doppler velocities higher than the Doppler velocity with the maximum power value and have normalized direction correlation values higher than the threshold (80%) are components with Doppler velocities of 19.6 to 22.4 km/h, and the spread width of the Doppler velocities is 2.8 km/h.

As shown in FIGS. 24 and 25, in a high Doppler velocity region (for example, at five points on the right side in a region 683 surrounded by a dotted line) with normalized direction correlation values higher than the threshold (80%), the power values of Doppler velocity components with Doppler velocities of 21 to 22.4 km/h decrease gently toward a rightmost one, as in the case of a front wheel.

That is, as can be seen from a Doppler feature of a portion not including a wheel of a running vehicle shown in FIGS. 20 and 21 and Doppler features of parts including a wheel shown in FIGS. 22 to 25, a feature of a Doppler component produced by rotation of a wheel appears both in Doppler spreading and a direction correlation power value.

Figure 26:
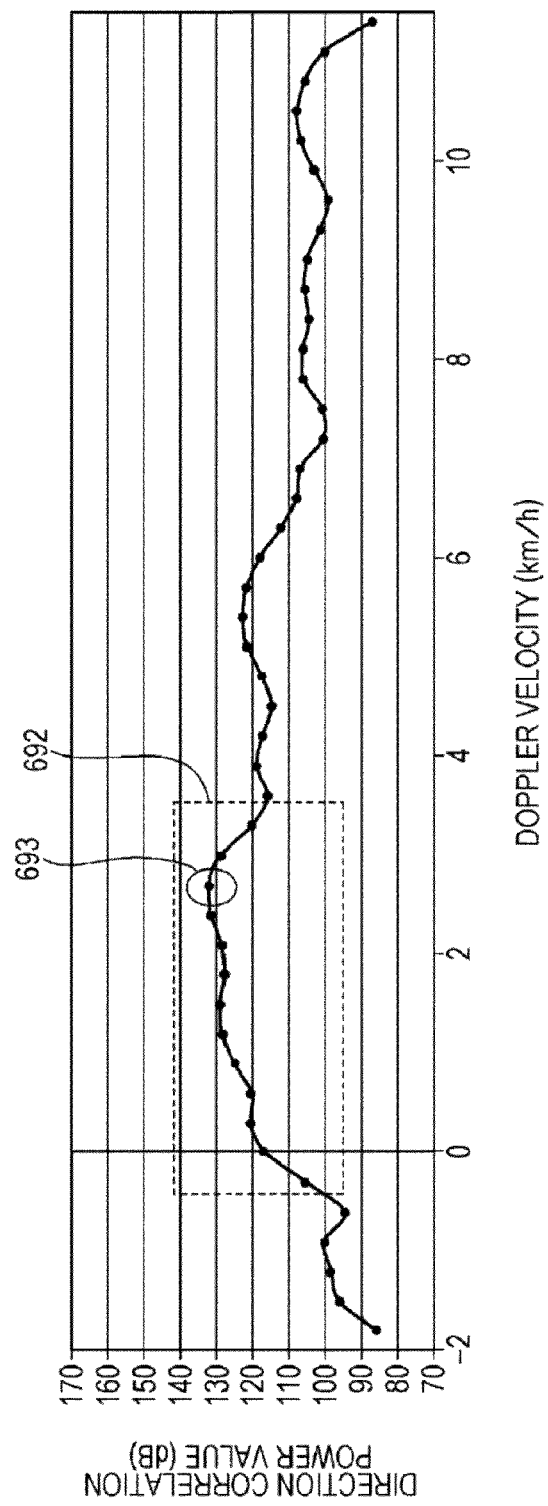
FIG. 26 shows one example of the relationship between Doppler velocity and direction correlation power value for a cell where a pedestrian is located, according to the present embodiment.

A graph of a Doppler-direction correlation power value and a graph of a Doppler-normalized direction correlation value for a pedestrian are shown in FIGS. 26 and 27, respectively. When a pedestrian walks, his/her legs and arms move back and forth. Doppler velocity components spread, and the spread width varies in accordance with the pace of walking.

As shown in FIG. 27, if a threshold for a normalized direction correlation value is set at, for example, 80%, as in the case of a vehicle, Doppler velocity components of a pedestrian spread from −0.3 to 3.3 km/h (a region 691), and the spread width of the Doppler velocity components is 3.6 (=3.3−(−0.3)) km/h. The spread width is wider than the Doppler spread width of a part not including a wheel of a running vehicle but is narrower than that of a part including a wheel. A component of −0.3 km/h is, for example, a Doppler velocity component produced when a hand swings in a direction opposite to a radar.

As shown in FIG. 26, the normalized direction correlation value is higher than the threshold in a pedestrian Doppler component region 692 surrounded by a dotted line. The spread width of Doppler velocities on the right of a Doppler velocity component (at a point surrounded by a circle 693 which is estimated to represent movement of a body of the pedestrian) with a maximum direction correlation power value in the region 692 is only 0.6 (=3.3−2.7) km/h. The value is smaller than the above-described feature quantity of a wheel.

As can be seen through observation of variations in power of several Doppler components (the number of which is determined on the basis of a Doppler velocity with a maximum power value and the velocity of a vehicle in question) on the most right side in the pedestrian Doppler component region 692 in FIG. 26, there is no characteristic phenomenon in which a direction correlation power value decreases gently with increase in Doppler velocity.

As described above, use of a Doppler-direction correlation power value and a Doppler-normalized direction correlation value allows extraction of a Doppler feature produced by rotation of a wheel and high-accuracy identification of a running vehicle based on the extracted Doppler feature.

<Shrinking of Piece of Direction Correlation Power Value Data>

A piece of direction correlation power value data is a piece of data describing a power value for each combination of a range bin, a direction, and a Doppler frequency. If the range step size is 20 cm, measurement of 20 m requires the number K of range bins to exceed 100. If the direction step is 1° in a wide angle radar (for example, ±60°), the number of direction angles is 121. If frequency analysis is performed by a 256-point DFT, the number M of Doppler frequencies is 256.

Thus, a piece of direction correlation power value data is a 100×121×256 three-dimensional (3D) data. Running vehicle sensing processing using the original unchanged data needs an enormous processing cost.

For this reason, the power value data shrinker 542 shrinks a piece of 3D direction correlation power value data into a piece of 2D direction correlation power value data remaining at least the Doppler frequency axis.

More specifically, the power value data shrinker 542 calculates the value of a piece of 2D (direction-Doppler frequency) direction correlation power value data (2D power profile) using, for example, Equation (12) below:

$$F_{s\_out}(n,\theta_u)=\Sigma_{k=1}^{K}F_{out}(k,n,\theta_u) \quad (12)$$

The value calculated by Equation (12) is a value, for each combination of direction angle and Doppler frequency, obtained by adding the direction correlation power values of all range bins with respect to non-noise directions (a direction of arrival of a reflected signal). Note that the term non-noise direction refers to a direction in which the number of ones with normalized direction correlation values which are continuously stable and higher than a threshold among Doppler components of interest for the predetermined direction and a predetermined range is larger than a predetermined number. For example, even if there are a large number of Doppler velocities with normalized direction correlation values not less than 0.8, a Doppler velocity, left and right adjacent Doppler velocities of which have far lower normalized direction correlation values, is treated as noise and is not added.

Alternatively, the power value data shrinker 542 may calculate the value of a piece of 2D direction correlation power value data, for each combination of direction angle and Doppler frequency, using, for example, Equation (13) below. That is, the value calculated by Equation (13) is a maximum one of direction correlation power values within all range bins for one related to a non-noise direction (a direction of arrival of a reflected signal).

$$F_{s\_out}(n,\theta_u)=\max\{F_{out}(k,n,\theta_u)|k=1,\ldots K\} \quad (13)$$

Note that K is a range bin number representing a measurable maximum distance.

The power value data shrinker 542 may generate, for example, a piece of 2D (range-Doppler frequency) direction correlation power value data. That is, the power value data shrinker 542 may, for each combination of range and Doppler frequency, use a value obtained by adding direction correlation power values of all non-noise direction angles, or by using the maximum one of the direction correlation power values within all non-noise direction angles as the value of a piece of direction correlation power value data in a 2D range-Doppler heat map.

<Operation of Radar Apparatus>

The operation of the radar apparatus 200 will be described.

FIG. 28 is a flowchart showing one example of the operation of the radar apparatus 200.

In step S1100, the radar transmitter 400 generates a radar signal and transmits the radar signal through the transmitting antenna 423.

In step S1200, each receiving antenna 511 of the radar receiver 500 receives an echo signal.

In step S1300, each delay profile generator 512 generates a piece of delay profile data from an echo signal received by the corresponding receiving antenna 511.

In step S1400, each Doppler frequency analyzer 521 determines whether pieces of delay profile data for one new frame are prepared. If pieces of data for one new frame are not yet prepared (NO in S1400), the Doppler frequency analyzer 521 advances the process to step S1500. On the other hand, if pieces of data for one new frame are prepared (YES in S1400), the Doppler frequency analyzer 521 advances the process to step S1600 (to be described later).

In step S1500, the radar transmitter 400 determines whether an instruction to end the running vehicle sensing process is given through a user operation or the like. If an instruction to end the process is not given (NO in S1500), the radar transmitter 400 returns the process to step S1100. Note that the processes in steps S1100 to S1500 are executed, for example, for each of the above-described cycles.

In step S1600, each Doppler frequency analyzer 521 generates a piece of Doppler frequency data from the prepared pieces of delay profile data for the one new frame.

In step S1700, the direction correlation power value calculator 531 generates a piece of direction correlation power value data from the generated piece of Doppler frequency data. The normalized direction correlation value calculator 532 generates a piece of normalized direction correlation value data from the generated piece of Doppler frequency data.

In step S1800, the power value data shrinker 542 shrinks the generated piece of 3D direction correlation power value data into a piece of 2D direction correlation power value data. For example, the power value data shrinker 542 creates a direction-Doppler power map described with reference to FIG. 7.

In step S1900, the moving object detector 543 senses an object on the basis of the piece of direction correlation power value data obtained through the shrinking. For example, as shown in FIG. 7, first to third moving objects corresponding to the three pieces 603$_1$ to 603$_3$ of direction correlation power value data parting from the strip-shaped region 602 representing motionless objects are detected in the direction-Doppler power map.

In step S2000, the wheel position estimator 544 and the vehicle identifier 545 perform the process of judging whether a position scope for a detected moving object candidate corresponds to a wheel, from the above-described feature of a waveform for a wheel on the basis of the piece of direction correlation power value data and the piece of normalized direction correlation value data. The wheel position determination process is a process of determining a wheel position and sensing a running vehicle, and the details thereof will be described later.

In step S2200, the vehicle type identifier 546 determines the vehicle type of a sensed running vehicle on the basis of a piece of vehicle type feature information and returns the process to step S1500.

If an instruction to end the process is given (YES in S1500), the radar transmitter 400 ends the series of processes. Note that the result outputter 550 outputs a detection result related to a running vehicle for one frame each time such a detection result is obtained or at predetermined intervals.

FIG. 29 is a flowchart showing one example of the wheel position determination process (step S2000 in FIG. 28). FIG. 29 illustrates an operation when a running vehicle behind a vehicle in question is observed from in front of the running vehicle.

In step S2010, the wheel position estimator 544 estimates wheel position candidates on the basis of a piece of local feature information. The wheel position estimator 544 outputs a piece of position information on estimated wheel candidates to the vehicle identifier 545.

More specifically, the wheel position estimator 544 estimates wheel position candidates by the method described in the "Features of Piece of Direction correlation Power Value Data and Piece of Normalized Direction correlation Value Data for Each Object". That is, the wheel position estimator 544 estimates, for each combination of a range bin and a direction angle corresponding to position regions of moving object candidates input from the moving object detector 543, whether a portion concerned is a wheel, on the basis of features of a front wheel, a rear wheel, and a vehicle body of a running vehicle. If the portion is a wheel, the wheel position estimator 544 also estimates whether the wheel is a front wheel or a rear wheel.

In step S2020, the vehicle identifier 545 groups a plurality of wheel candidates indicated by the input pieces of position information.

In step S2030, the vehicle identifier 545 selects one front wheel position candidate. Note that the processes in steps S2040 to S2100 to be described below are performed for the selected front wheel position candidate.

In step S2040, the vehicle identifier 545 determines, for the selected front wheel position candidate, whether another front wheel position candidate is present within a (left or right) position scope where another front wheel may be present (searches for a front wheel). That is, the vehicle identifier 545 determines whether there is another front wheel, on the assumption that a vehicle has a pair of front wheels.

If another front wheel (front wheel position candidate) is present (YES in S2040), the vehicle identifier 545 advances the process to step S2050. On the other hand, if no more front wheel is present (NO in S2040), the vehicle identifier 545 advances the process to step S2090 (to be described later).

In step S2050, the vehicle identifier 545 records the positions of two front wheels.

In step S2060, the vehicle identifier 545 acquires an intermediate position between the two front wheels by, for example, identifying a position corresponding to the average of two range bin numbers and the average value of two direction angles. The vehicle identifier 545 determines whether the intermediate position corresponds to a vehicle body portion by the method described in the "Features of Piece of Direction correlation Power Value Data and Piece of Normalized Direction correlation Value Data for Each Object". That is, the vehicle identifier 545 determines whether a piece of Doppler-direction correlation power value data and a piece of Doppler-normalized direction correlation value data at the intermediate position exhibit a feature of a vehicle body.

If the intermediate position between the two front wheels corresponds to a vehicle body (YES in S2060), the vehicle identifier 545 advances the process to step S2070. On the other hand, if the intermediate position between the two front wheels does not correspond to a vehicle body (NO in S2060), the vehicle identifier 545 advances the process to step S2090 (to be described later).

In step S2070, the vehicle identifier 545 determines, on the basis of the two front wheel positions recorded earlier, whether wheel position candidates for rear wheels are present within position ranges where two rear wheels may be present (searches for rear wheels). That is, the vehicle identifier 545 determines whether two rear wheels are present, on the assumption that two rear wheels are present behind front wheels of a running vehicle behind.

If two rear wheels are present (YES in S2070), the vehicle identifier 545 advances the process to step S2080. On the other hand, if two rear wheels are not present (NO in S2070), the vehicle identifier 545 advances the process to step S2090 (to be described later).

In step S2080, the vehicle identifier 545 determines (identifies) that a vehicle is present and sets two rear wheel positions determined in step S2070 together with the two front wheel positions recorded in step S2050 as a piece of wheel position information of the vehicle.

In step S2090, the vehicle identifier 545 determines that the selected wheel position candidate is not a wheel position of a running vehicle.

In step S2100, the vehicle identifier 545 determines whether there is any more front wheel position candidate that is not yet subjected to the judgment process as to a wheel position. If there is an unprocessed front wheel position candidate (YES in S2100), the vehicle identifier 545 returns the process to step S2030 and selects one unprocessed front wheel position candidate. On the other hand, if there is no unprocessed front wheel position candidate (NO in S2100), the vehicle identifier 545 advances the process to step S2200 in FIG. 28.

Note that, at the time of advancement of the process to step S2200 in FIG. 28, the vehicle identifier 545 outputs the piece of wheel position information of the vehicle together with an identification result indicating that the moving object candidates constitute a vehicle to the vehicle type identifier 546.

With the above-described operation, the radar apparatus 200 can continue the process of sensing a running vehicle and an object other than a running vehicle distinctively from each other.

<Effects of Present Embodiment>

As has been described above, the radar apparatus 200 according to the present embodiment determines, on the basis of a piece of direction correlation power value data and a piece of normalized direction correlation value data, whether an object as a reflector of a radar signal is a running vehicle. In other words, the radar apparatus 200 extracts a feature specific to a wheel portion of a running vehicle by analyzing reflected signal power with reference to a prior-art-ignored index which is different from the reflected signal power. This allows the radar apparatus 200 to detect a running vehicle with high accuracy.

The radar apparatus 200 can acquire a delay profile for each beam scanning directions by performing fine beam scanning using a transmitting array antenna and can estimate a direction of arrival within a beam scanning range from the acquired delay profiles. Coarse-to-fine processing allows acquisition of only a piece of direction correlation power value data and a piece of normalized direction correlation value data necessary for identification at low cost. For this reason, the radar apparatus 200 can efficiently perform target identification by high-resolution scanning. Note that the process of controlling the direction of a transmit signal using a transmitting array antenna and performing rough direction estimation is called coarse processing while the process of performing direction estimation within a beam scanning range is called fine processing.

The radar apparatus 200 also detects a wheel position of a running vehicle on the basis of a waveform of a piece of direction correlation power value data. With this configuration, the radar apparatus 200 can detect a running vehicle even if the movement velocity of the radar apparatus 200 itself is unknown.

<Modifications of Present Embodiment>

Note that a method for determining, on the basis of a waveform of a piece of direction correlation power value data, whether a portion concerned corresponds to a wheel portion is not limited to the above-described example.

In the above description, the radar apparatus 200 performs generation of a delay profile for each combination of a direction and a range, that is, two-dimensional (2D) scanning to perform running vehicle detection and vehicle type identification without any regard to a component in a height direction (vertical direction). The present disclosure, however, is not limited to this.

That is, the radar apparatus 200 may perform three-dimensional (3D) scanning using two-dimensionally arranged array antennas (for example, 16 array antenna elements arranged in a 4×4 matrix) and perform running vehicle detection and vehicle type identification with regard to an additional component in the height direction.

In this case, a unit (cell) for the radar apparatus 200 to determine whether a portion concerned corresponds to a wheel position is a region defined by, for example, a combination of a range (k), a direction angle (θ), and a height (h). The radar apparatus 200 can detect a vertical position and a vertical length of a wheel position of a running vehicle and perform vehicle type identification on the basis of the pieces of information. That is, the radar apparatus 200 is capable of higher-accuracy running vehicle detection and vehicle type identification. Note that the 2D scanning-based case can reduce processing loads more effectively.

In particular, in the case of 3D scanning, there may be a cell which does not include a component of an echo signal from a vehicle body portion but includes only a component of an echo signal from a wheel portion. That is, a peak as described with reference to FIG. 1B may not appear in a piece of direction correlation power value data for a cell corresponding to a wheel position.

For this reason, the radar apparatus 200 may determine a wheel position not on the basis of the presence or absence of a peak but on the basis of whether a waveform on the Doppler frequency axis of a direction correlation power value has a portion which changes gently and smoothly along the Doppler frequency axis in a high correlated value band. Note that the radar apparatus 200 may use or may not use a requirement that a value (for example, an average value) for direction correlation power values of such a portion is higher than a value (for example, an average value) in a band other than the high correlated value band.

In the above description, the radar apparatus 200 performs the two-step process of first determining a wheel position and determining a vehicle type on the basis of an echo signal component of a portion determined as a wheel position. The present disclosure, however, is not limited to this.

That is, the radar apparatus 200 may set, as a wheel position candidate, only a portion estimated as a wheel portion of a predetermined vehicle type on the basis of a piece of information indicating a local feature which is a feature of at least one of a position and an echo signal component in a direction in which a wheel portion of the predetermined vehicle type is present.

In the above description, the radar apparatus 200 first detects a moving object position and performs wheel position estimation for a region of the detected moving object position. The present disclosure, however, is not limited to this.

That is, the radar apparatus 200 may skip moving object position detection and perform wheel position detection based on a piece of normalized direction correlation value data and a piece of direction correlation power value data for each direction, regardless of the presence or absence of a moving object.

The radar apparatus 200 need not perform vehicle type identification. In this case, the result outputter 550 outputs, as a detection result, only a piece of information on the presence or absence of a running vehicle, the position of a running vehicle, or the velocity of the running vehicle.

The radar apparatus 200 need not shrink a piece of direction correlation power value data and may perform object sensing on the basis of a piece of direction correlation power value data which is not shrunk.

Various types of thresholds used by the radar apparatus 200 to detect a running vehicle are not limited to the above-described example. The radar apparatus 200 may acquire a piece of outside world information related to a detection requirement, such as weather or the velocity of a vehicle in question, make reference to a table in which a piece of outside world information and a threshold to be set are associated with each other, and change a threshold in accordance with the acquired piece of information.

A direction correlation power value and a normalized direction correlation value are not limited to the above-described ones. For example, if either one of the distance to a running vehicle and the direction of the running vehicle need not be detected, a direction correlation power value may be a piece of information indicating the strength of an echo signal for each combination of a Doppler frequency and only a necessary one of a distance and a direction. A normalized direction correlation value may be a piece of information indicating the likelihood of the direction of arrival of an echo signal for each combination as described above.

Some of components of the radar apparatus 200 may be separated from the others of the radar apparatus 200 by being arranged in a server or the like on a network. In this case, the components need a communicator for communication with each other.

A specific aspect of the present disclosure is not limited to the description of the embodiment. It is apparent to those skilled in the art that various types of variations or modifications are conceivable within the scope of the claims, and the variations and modifications are, of course, understood to belong to the technical scope of the present disclosure.

<Summary of Present Disclosure>

A radar apparatus according to the present disclosure includes a Doppler frequency acquirer which, in operation, acquires a Doppler frequency for each of range bins from an echo signal, received via at least one antenna, which is a radar signal reflected by an object, a direction correlation power value calculator which, in operation, calculates, for each of combinations of the range bins and the Doppler frequencies, a direction correlation power value indicating strength of the echo signal for each of directions, a normalized direction correlation value calculator which, in operation, calculates, for each of the combinations of the range bins and the Doppler frequencies, a normalized direction correlation value indicating likelihood of a direction of arrival of the echo signal for each of the directions, and a running vehicle detector which, in operation, determines, on a basis of the direction correlation power value and the normalized direction correlation value, whether the object is a running vehicle.

Note that, in the radar apparatus, the running vehicle detector may determine whether the object is the running vehicle, on a basis of a distribution of the direction correlation power value in a predetermined correlated value band on a Doppler frequency axis where the normalized direction correlation value is not less than a predetermined correlated value threshold.

In the radar apparatus, the running vehicle detector may determine, for each of the directions, whether a condition that a waveform on the Doppler frequency axis of the direction correlation power value has a portion which changes within a predetermined range along the Doppler frequency axis in the correlated value band is fulfilled and determine the direction that satisfies the requirement as a direction in which a wheel portion of the running vehicle is present.

In the radar apparatus, the running vehicle detector may determine whether a requirement that a waveform on the Doppler frequency axis of the direction correlation power value has a peak portion and a portion which changes within a predetermined range along the Doppler frequency axis inside the predetermined correlated value band in a direction away from the peak portion toward a portion outside the correlated value band is fulfilled and determine that a wheel portion of the running vehicle is present in the direction that fulfills the condition.

The radar apparatus may include an information storage which, in operation, stores a piece of local feature information indicating a feature of at least one of a position and an echo signal component in the direction, in which a wheel portion of a running vehicle is present, the piece of local feature information being generated in advance by machine learning, and a wheel position estimator which, in operation, estimates the direction, in which the wheel portion is present, on a basis of the piece of local feature information, and the running vehicle detector may determine whether the condition is fulfilled for the direction, in which the wheel portion is estimated to be present.

In the radar apparatus, the running vehicle detector may determine whether the object is a running automobile of the predetermined vehicle type, on a basis of at least one of a position and an echo signal component in the direction, in which the wheel portion is determined to be present.

The radar apparatus may include an information storage which, in operation, stores a piece of vehicle type feature information indicating a feature of at least one of a position and an echo signal component in the direction, in which a wheel portion of an automobile of a predetermined vehicle type is present, the piece of vehicle type feature information being generated in advance by machine learning, and the running vehicle detector may determine whether the direction which fulfills the condition corresponds to the wheel portion of the automobile of the predetermined vehicle type, on a basis of the piece of vehicle type feature information.

In the radar apparatus, the Doppler frequency acquirer may acquire a Doppler frequency from the echo signal via each of a plurality of the antenna elements, the direction correlation power value calculator may calculate, as the direction correlation power value, a square of an inner product of a direction vector indicating complex responses of the plurality of antenna elements and a correlation vector indicating components of the plurality of echo signals when the echo signal arrives from the direction, and the normalized direction correlation value calculator may calculate, as the normalized direction correlation value, a value obtained by normalizing the inner product by a 2-norm of the correlation vector.

A running vehicle sensing method according to the present disclosure includes acquiring a Doppler frequency for each of range bins from an echo signal, received via at least one antenna, which is a radar signal reflected by an object, calculating, for each of combinations of the range bins and the Doppler frequencies, a direction correlation power value indicating strength of the echo signal for each of directions, calculating, for each of the combinations of the range bins and the Doppler frequencies, a normalized direction correlation value indicating likelihood of a direction of arrival of the echo signal for each of the directions, and determining, on a basis of the direction correlation power value and the normalized direction correlation value, whether the object is a running vehicle.

The present disclosure is useful as a radar apparatus and a running vehicle sensing method capable of sensing a running vehicle with high accuracy and is particularly suitable as a radar apparatus and a running vehicle sensing method for improving the performance of a safety system in a traffic environment.

What is claimed is:

1. A radar apparatus comprising:
   a Doppler frequency acquirer which, in operation, acquires a Doppler frequency for each of plural range bins from an echo signal, received via at least one antenna, which is a radar signal reflected by an object, each of the plural range bins being a unit of processing for a search target distance;
   a direction correlation power value calculator which, in operation, calculates, for each of plural combinations of the plural range bins and the Doppler frequencies, a direction correlation power value indicating strength of the echo signal for each of plural directions of arrival of the echo signal;
   a normalized direction correlation value calculator which, in operation, calculates, for each of the plural combinations of the plural range bins and the Doppler frequencies, a normalized direction correlation value indicating likelihood of a direction of arrival of the echo signal for each of the plural directions; and
   a running vehicle detector which, in operation, determines, on a basis of the direction correlation power value and the normalized direction correlation value, whether the object is a running vehicle.

2. The radar apparatus according to claim 1, wherein the running vehicle detector determines whether the object is a running vehicle, on a basis of a distribution of the direction correlation power value in a predetermined correlated value band on a Doppler frequency axis where the normalized direction correlation value is not less than a predetermined correlated value threshold.

3. The radar apparatus according to claim 2, wherein the running vehicle detector determines, for each of the plural directions, whether a condition that a waveform on the Doppler frequency axis of the direction correlation power value has a portion which changes within a predetermined range along the Doppler frequency axis in the correlated value band is fulfilled and determines a direction that fulfills the condition as a direction in which a wheel portion of the running vehicle is present.

4. The radar apparatus according to claim 3, further comprising:
   an information storage which, in operation, stores a piece of local feature information indicating a feature of at least one of a position and an echo signal component in the direction in which a wheel portion of a running vehicle is present, the piece of local feature information being generated in advance by machine learning; and
   a wheel position estimator which, in operation, estimates the direction in which the wheel portion is present, on a basis of the piece of local feature information, wherein
   the running vehicle detector determines whether the condition is fulfilled for the direction in which the wheel portion is estimated to be present.

5. The radar apparatus according to claim 3, wherein
the running vehicle detector further determines whether the object is a running automobile of a predetermined vehicle type, on a basis of at least one of a position and an echo signal component in the direction in which the wheel portion is determined to be present.

6. The radar apparatus according to claim 5, further comprising:
an information storage which, in operation, stores a piece of vehicle type feature information indicating a feature of at least one of a position and an echo signal component in the direction in which a wheel portion of an automobile of a predetermined vehicle type is present, the piece of vehicle type feature information being generated in advance by machine learning, wherein
the running vehicle detector determines whether the direction, which fulfills the condition, corresponds to the wheel portion of the automobile of the predetermined vehicle type, on a basis of the piece of vehicle type feature information.

7. The radar apparatus according to claim 3, wherein
the Doppler frequency acquirer acquires a Doppler frequency from the echo signal via each of a plurality of the antenna elements,
the direction correlation power value calculator calculates, as the direction correlation power value, a square of an inner product of a direction vector indicating complex responses of the plurality of antenna elements and a correlation vector indicating components of the plurality of echo signals when the echo signal arrives from the direction, and
the normalized direction correlation value calculator calculates, as the normalized direction correlation value, a value obtained by normalizing the inner product by a 2-norm of the correlation vector.

8. The radar apparatus according to claim 2, wherein
the running vehicle detector determines, for each of the plural directions, whether a condition that a waveform on the Doppler frequency axis of the direction correlation power value has a peak portion and a portion which changes within a predetermined range along the Doppler frequency axis inside the predetermined correlated value band in a direction away from the peak portion toward a portion outside the correlated value band is fulfilled and determines that a wheel portion of the running vehicle is present in a direction that fulfills the condition.

9. A running vehicle sensing method comprising:
acquiring a Doppler frequency for each of plural range bins from an echo signal, received via at least one antenna, which is a radar signal reflected by an object, each of the plural range bins being a unit of processing for a search target distance;
calculating, for each of plural combinations of the range bins and the Doppler frequencies, a direction correlation power value indicating strength of the echo signal for each of plural directions of arrival of the echo signal;
calculating, for each of the plural combinations of the plural range bins and the Doppler frequencies, a normalized direction correlation value indicating likelihood of a direction of arrival of the echo signal for each of the plural directions; and
determining, on a basis of the direction correlation power value and the normalized direction correlation value, whether the object is a running vehicle.

10. A direction-of-arrival estimation apparatus comprising:
a Doppler frequency acquirer which, in operation, acquires a Doppler frequency for each of plural range bins from an echo signal, received via at least one antenna, which is a radar signal reflected by an object, each of the plural range bins being a unit of processing for a search target distance;
a direction correlation power value calculator which, in operation, calculates, for each of plural combinations of the plural range bins and the Doppler frequencies, a direction correlation power value indicating strength of the echo signal for each of plural directions of arrival of the echo signal;
a normalized direction correlation value calculator which, in operation, calculates, for each of the plural combinations of the plural range bins and the Doppler frequencies, a normalized direction correlation value indicating likelihood of a direction of arrival of the echo signal for each of the plural directions; and
an outputter which, in operation, outputs the direction correlation power value and the normalized direction correlation value to a running vehicle detector which determines whether the object is a running vehicle.

11. A direction-of-arrival estimation method comprising:
acquiring a Doppler frequency for each of plural range bins from an echo signal, received via at least one antenna, which is a radar signal reflected by an object, each of the plural range bins being a unit of processing for a search target distance;
calculating, for each of plural combinations of the plural range bins and the Doppler frequencies, a direction correlation power value indicating strength of the echo signal for each of plural directions of arrival of the echo signal;
calculating, for each of the plural combinations of the plural range bins and the Doppler frequencies, a normalized direction correlation value indicating likelihood of a direction of arrival of the echo signal for each of the plural directions; and
outputting the direction correlation power value and the normalized direction correlation value to a running vehicle detection apparatus which determines whether the object is a running vehicle.

* * * * *